US010111105B2

(12) United States Patent
Li et al.

(10) Patent No.: US 10,111,105 B2
(45) Date of Patent: Oct. 23, 2018

(54) METHODS USED IN CONTROL NODES, AND ASSOCIATED CONTROL NODES

(71) Applicant: Telefonaktiebolaget LM Ericsson (publ), Stockholm (SE)

(72) Inventors: Gen Li, Beijing (CN); Jinhua Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 171 days.

(21) Appl. No.: 15/028,864

(22) PCT Filed: Jun. 26, 2015

(86) PCT No.: PCT/CN2015/082519
§ 371 (c)(1),
(2) Date: Apr. 12, 2016

(87) PCT Pub. No.: WO2016/206104
PCT Pub. Date: Dec. 29, 2016

(65) Prior Publication Data
US 2017/0171758 A1 Jun. 15, 2017

(51) Int. Cl.
*H04W 16/10* (2009.01)
*H04L 25/02* (2006.01)
*H04W 72/08* (2009.01)

(52) U.S. Cl.
CPC ......... *H04W 16/10* (2013.01); *H04L 25/0226* (2013.01); *H04W 72/082* (2013.01)

(58) Field of Classification Search
CPC ............... H04W 16/10; H04W 72/082; H04W 72/1231; H04W 72/042; H04W 72/0446;
(Continued)

(56) References Cited

U.S. PATENT DOCUMENTS

2011/0021153 A1* 1/2011 Safavi ................. H04B 7/0434
455/63.1
2013/0201966 A1* 8/2013 Weng .................... H04W 72/04
370/336
(Continued)

FOREIGN PATENT DOCUMENTS

CN    101601198 A    12/2009
CN    102624465 A    8/2012
(Continued)

OTHER PUBLICATIONS

International Search Report and Written Opinion for Application No. PCT/CN2015/082519, dated Mar. 31, 2016, 11 pages.
(Continued)

*Primary Examiner* — Kwang B Yao
*Assistant Examiner* — Hardikkumar Patel
(74) *Attorney, Agent, or Firm* — NDWE LLP

(57) ABSTRACT

Method used in a first control node controlling one or more first links among two or more first radio nodes in a first network, and an associated first control node. Transmitting desired sounding and sensing related parameters of the first control node to a second control node controlling one or more second links among two or more second radio nodes in a second network neighboring the first network and operating at the same frequency as the first network. Receiving, from the second control node, sounding and sensing related parameters to be applied to the one or more second links, which are adjusted based on the desired sounding and sensing related parameters of the first control node. Adjusting the desired sounding and sensing related parameters of the first control node, based on the sounding and sensing related parameters to be applied to the one or more second links and applying them.

27 Claims, 13 Drawing Sheets

(58) Field of Classification Search
CPC ..... H04W 28/18; H04W 48/16; H04W 24/10; H04L 25/0226; H04L 5/14; H04L 1/002; H04L 1/0026; H04L 5/1469; H04L 43/50; H04B 7/0626
See application file for complete search history.

(56) References Cited

U.S. PATENT DOCUMENTS

| | | | |
|---|---|---|---|
| 2013/0223268 A1* | 8/2013 | Jung | H04J 11/005 370/252 |
| 2013/0273833 A1 | 10/2013 | Wang et al. | |
| 2014/0177449 A1 | 6/2014 | Novak et al. | |
| 2014/0198766 A1* | 7/2014 | Siomina | H04W 72/082 370/330 |
| 2014/0315490 A1 | 10/2014 | Hughes et al. | |
| 2014/0328264 A1* | 11/2014 | Merlin | H04W 74/04 370/329 |
| 2015/0264652 A1* | 9/2015 | Zhang | H04W 52/143 455/522 |

FOREIGN PATENT DOCUMENTS

| | | |
|---|---|---|
| CN | 103378935 A | 10/2013 |
| WO | 2014047773 A1 | 4/2014 |
| WO | 2014058282 A1 | 4/2014 |
| WO | 2016095084 A1 | 6/2016 |

OTHER PUBLICATIONS

International Search Report and Written Opinion for PCT Application No. PCT/CN2016/087047, dated Sep. 22, 2016, 11 pages.
International Preliminary Report on Patentability for Application No. PCT/CN2015/082519, dated Jan. 4, 2018, 6 pages.
International Preliminary Report on Patentability for Application No. PCT/CN2016/087047, dated Jan. 4, 2018, 6 pages.

* cited by examiner

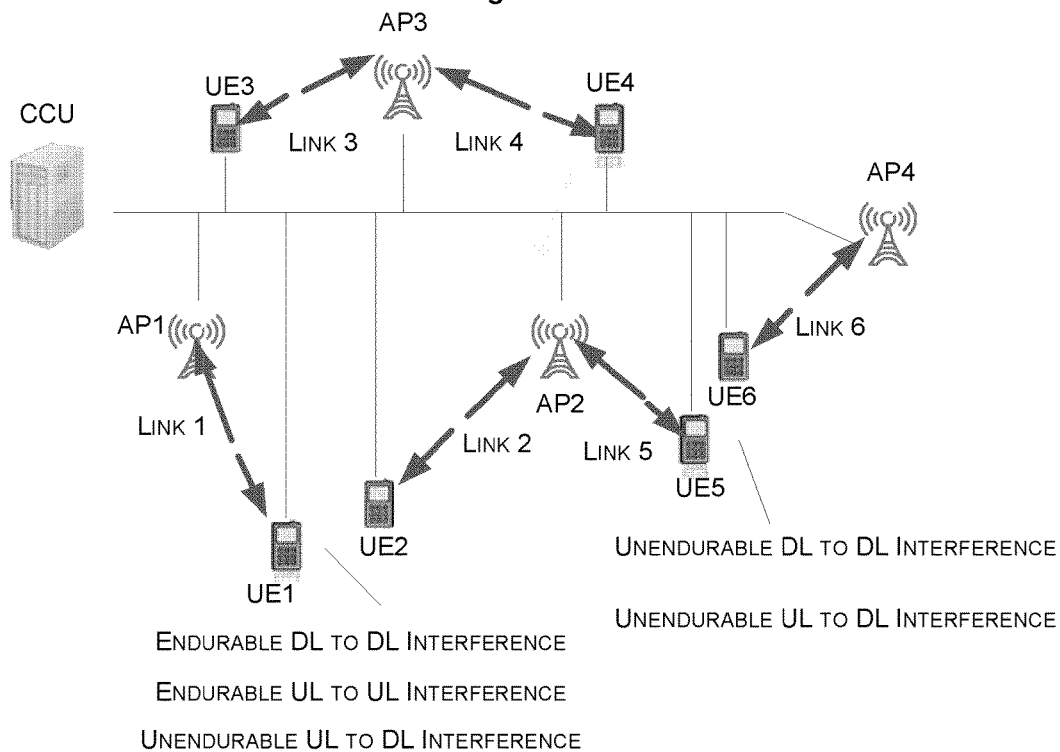
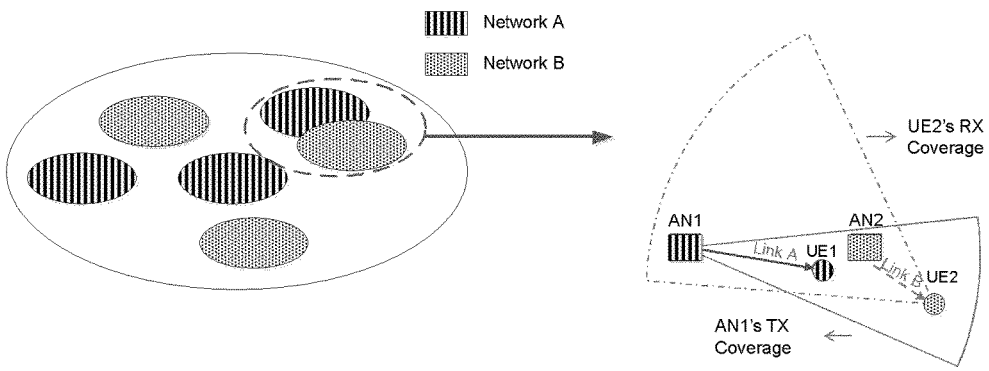

Fig. 19
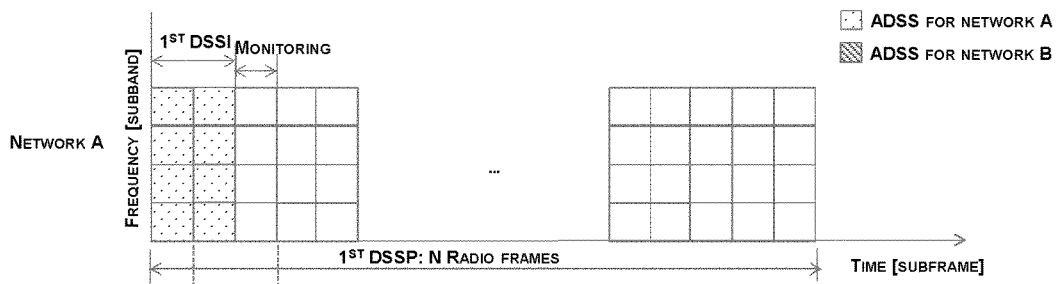
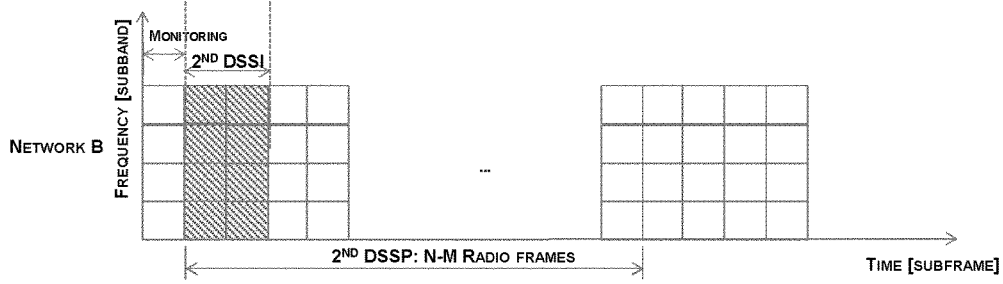
Fig. 20
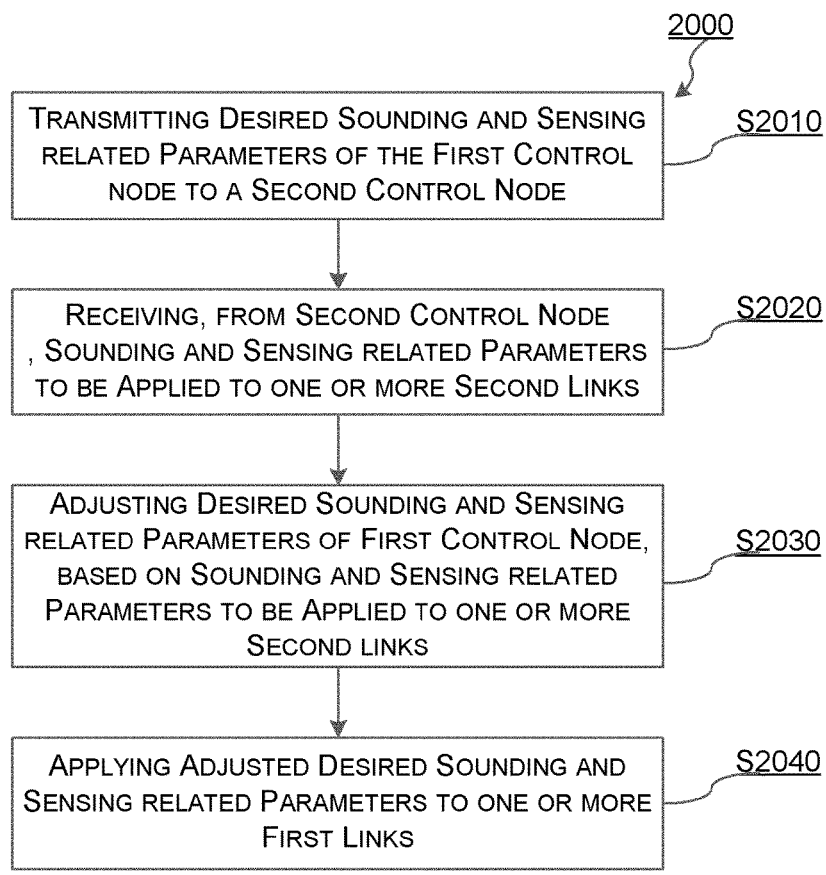

METHODS USED IN CONTROL NODES, AND ASSOCIATED CONTROL NODES

CROSS-REFERENCE TO RELATED APPLICATIONS

This application is a National stage of International Application No. PCT/CN2015/082519, filed Jun. 26, 2015, which is hereby incorporated by reference.

TECHNICAL FIELD

The technology presented in this disclosure generally relates to the technical field of wireless communication networks. More particularly, the present disclosure relates to a method used in a first control node controlling one or more first links among two or more first radio nodes in a first network, and the associated first control node, and to a method used in a second control node controlling one or more second links among two or more second radio nodes in a second network, and the associated second control node.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

Currently, wireless communication networks or systems operating at high frequencies from 30-300 GHz are emerging as a promising technology to meet exploding bandwidth requirements by enabling multi-Gb/s speeds. For example, the 5th Generation (5G) network is likely to be a combination of evolved 3rd Generation (3G) technologies, the 4th Generation (4G) technologies and emerging or substantially new components such as Ultra-Density Network (UDN), which is also referred to as MMW Radio Access Technology (RAT). At such high frequencies, a large number of antennas can be available at a transmitter, a receiver, or both. In order to make up for the large propagation loss that typically occurs, beam-forming becomes a very important feature in MMW wireless systems.

Beam-forming is a signal processing technique used for directional signal transmission and/or reception. For Transmitter (TX) beamforming, the signals are concentrated in the desired direction via applying a selected precoding vector for the TX antenna array. For Receiver (RX) beamforming, the RX beam of the receiver antennas are concentrated in the incoming direction of the radio signals by applying a selected precoding vector for the RX antenna array. Beam-forming can be used at both the transmitting and receiving ends in order to achieve spatial selectivity. The improvement compared with omnidirectional reception/transmission is known as a beam-forming gain. When multiple antennas are available at transmitters, receivers or both, it is therefore important to apply efficient beam patterns to the antennas to better exploit the spatial selectivity of the corresponding wireless channel.

FIG. 1 schematically shows one example MMW RAT network. As shown in FIG. 1, there is a network node or a control node called as Central Control Unit (CCU), which is at least responsible for parameter configurations and coordination among Access Nodes (ANs), e.g., AN1, AN2, AN3, and AN4.

Typically, received power in a receiver side of a link can be expressed as:

$$P_{rx} = P_{TX} \cdot G_{TX} \cdot G_{RX} \left(\frac{r}{4\pi\lambda}\right)^2 \cdot e^{-ar}$$

where $P_{TX}$ is transmitted power from a transmitter side of the link, $G_{TX}$ and $G_{RX}$ are beamforming gains of transmitting and receiving antennas, respectively, $\lambda$ is the wavelength, and a is the attenuation factor due to absorption in the medium. For an MMW-wave link at 60 GHz, oxygen absorption loss can be as high as 16 dB/km.

From the above formula, it is clear that the attenuation of radio wave is proportional to $1/\lambda^2$. With the same propagation distance, 60 GHz attenuates 29.5 dB more compared to 2 GHz, without considering the oxygen absorption.

In considering this, high gain beam-forming is mandatory in order to compensate the extra attenuation. Thanks to the small wavelength, more antenna elements can be integrated in the antenna panel with the same size. This makes it possible to reach a higher beam-forming gain. However, if there are several tens or several hundreds of antenna elements, one Radio Frequency (RF) chain (either TX RF chain or RX RF chain) for each antenna element is inapplicable due to unacceptable cost. In such a case, multiple antenna elements share one RF chain and a specific analog phase adjustment is applied for each antenna in order to adjust the beam direction and maximize the beam-forming gain. Due to the narrow TX beam, it is needed to steer transmission of beacon signals to enable AN discovery area, and to preform beam-forming training to maximize the beam-forming gain.

Meanwhile, high gain beam-forming could bring challenges, including, e.g., hidden node problem and deafness problem. Those problems will be described in detail hereafter.

FIG. 2 illustrates an example of the hidden node problem caused by directivity of high gain beam-forming. As shown in FIG. 2, link 1 is composed by Access Point 1 (AP1) and User Equipment 1 (UE1), and link 2 is composed by AP2 and UE2. When AP2 is transmitting to UE2, neither AP1 or UE 1 can detect the channel utilized by AP2 and UE2 because both AP1 and UE1 are outside of the TX beam coverage from AP2 to UE2. However, when AP1 transmits data to UE1, its TX beam can reach UE2 and cause interference.

FIG. 3 illustrates an example of the deafness problem caused by directivity of high gain beam-forming. As shown in FIG. 3, UE 1 and AP1 compose link 1 and UE2 and AP2 compose link 2. The link 2 has ongoing data transmission from AP2 to UE2. But this is not detected by UE1 because UE1 does not monitor (or sense) this direction. However, when UE 1 starts data transmission, the data receiving by UE2 can be clearly impacted due to UE1 and UE2 are close to each other.

Currently, it is supposed that the total carrier bandwidth of the MMW-RAT can be up to 1 or 2 GHz. This bandwidth can be composed by a number of sub-band carriers of a certain bandwidth, e.g. 100 MHz. By way of example, FIG. 4 illustrates one MMW-RAT carrier with 4 sub-bands. The smallest resource grid in FIG. 4 corresponds to a sub-band in the frequency domain and to a subframe in the time domain, and may be referred to as a sounding and sensing resource element. Of course, the sounding and sensing resource element may be also in terms of code.

To allocate the available resources, a contention based resource allocation scheme and/or a scheduling based resource allocation scheme may be applied in MMW-RAT as the basic policy of collision avoidance. A contention based resource allocation scheme provides a mechanism to compete for the channel based on the self-determination on the channel availability. In a scheduling based resource allocation scheme, a scheduler, e.g., a CCU as shown in FIG. 1, gains the resource controllability first via either contention based method or coordination method first and allocates the resource to controlled links.

There could be certain combination of the contention based resource allocation scheme and the scheduling based resource allocation scheme. FIG. 5 illustrates an example of a complex interference situation in a MMW-RAT network. As shown in FIG. 5, due to directivity of high gain beam-forming, Link 1 and Link 2 may have unendurable UpLink (UL) to DownLink (DL) interference while Link 5 and Link 6 may have unendurable DL to DL interference and UL to DL interference. Such interference may be referred to inter-link interference hereinafter.

In addition to links within a MMW RAT network, the inter-link interference may further involve links between two MMW RAT networks operating at the same frequency spectrum. For sake of simplicity, two networks operating at the same frequency spectrum may be called as spectrum sharing networks, which are typically, e.g., two partially overlapping, adjacent or neighboring (i.e., with certain distance in-between) networks. In regard of this, the inter-link interference within one network (e.g., the interference as shown in FIG. 5) may be referred to as intra-network inter-link interference, while the inter-link interference between two spectrum sharing networks may be referred to as inter-network inter-link interference hereinafter. That is, the inter-network inter-link interference will predominantly occur between two spectrum sharing networks.

FIG. 6 shows a typical scenario of inter-network inter-link interference between two spectrum sharing MMW RAT networks. It is assumed that there are several MMW RAT networks in such a scenario, including Network A and Network B operating at the same frequency spectrum. There is a link (Link A) from AN 1 to UE 1 in Network A, and there is a link (Link B) from AN 2 to UE 2 in Network B. When AN 1 and AN 2 are transmitting respective sounding signals simultaneously (at the same time, both of UE 1 and UE 2 are sensing sounding signals, i.e., being in RX state), AN 1's TX beam coverage partly overlaps with UE 2's RX beam coverage, as illustrated. This is, Link B is interfered by Link A.

Due to directivity of high gain beam-forming, the collision determination is more complex than omni-transmission. The traditional measurement does not work well due to the aforementioned deafness and hidden node problems. Besides, though carrier sensing methods commercially used in Wireless Local Area Network (WLAN, 802.11) and Wireless Personal Area Network (WPAN, 802.15) are developed, they are mainly for local access system. It is a distributed carrier sensing scheme, i.e., the carrier sensing is done by each node independently. For MMW RAT, firstly it is expected that there can be better dimensioned deployment involving multiple nodes of APs and UEs, and better network controllability (e.g., self-optimization, self-organization, and mobility) than Wireless Fidelity (WiFi) is targeted. Secondly, MMW RAT is expected to provide much better Quality of Service (QoS) than WiFi. In this sense, a better measurement than simple distributed carrier sensing of WiFi is desired.

The interference measurements in 3G and 4G wireless systems are mainly designed to measure the inter-cell/inter-Transmission-Point interference, rather than inter-link interference (including the intra-network inter-link interference and the inter-network inter-link interference). Due to small sector size and the large overlapping coverage in case of MMW RAT, the similar measurement as 3G or 4G systems is not enough to identify links in collision and help the interference management.

SUMMARY

It is in view of the above considerations and others that the various embodiments of the present technology have been made. To be specific, aiming to at least some of the above defects, the present disclosure proposes to coordinate sounding and sensing parameters between two different networks, such as two spectrum sharing networks.

According to a first aspect of the present disclosure, there is proposed a method used in a first control node controlling one or more first links among two or more first radio nodes in a first network. The method includes: transmitting desired sounding and sensing related parameters of the first control node to a second control node controlling one or more second links among two or more second radio nodes in a second network neighboring the first network and operating at the same frequency as the first network; receiving, from the second control node, sounding and sensing related parameters to be applied to the one or more second links, which are adjusted based on the desired sounding and sensing related parameters of the first control node; adjusting the desired sounding and sensing related parameters of the first control node, based on the sounding and sensing related parameters to be applied to the one or more second links; and applying the adjusted desired sounding and sensing related parameters to the one or more first links.

Preferably, the desired sounding and sensing related parameters of the first control node comprise a first sounding and sensing resource parameter for specifying a first sounding and sensing window. The sounding and sensing related parameters to be applied to the one or more second links comprise a second sounding and sensing resource parameter for specifying a second sounding and sensing window. Adjusting sounding and sensing related parameters to be applied to the one or more first links includes: defining a window aligned with the second sounding and sensing window as a sensing window for the two or more first radio nodes sensing a sounding signal transmitted by the one or more second radio nodes.

Preferably, the method further includes: receiving one or more sensing results from each of the two or more first radio nodes serving a receiving node of a link in the first network; and determining a Directional Link Interference Map (DLIM) based on the received one or more sensing results.

According to a second aspect of the present disclosure, there is proposed a method used in a second control node controlling one or more second links among two or more second radio nodes in a second network. The method includes: receiving, from a first control node controlling one or more second links among two or more first radio nodes in a first network neighboring the second network and operating at the same frequency as the second network, desired sounding and sensing related parameters of the first control node; adjusting sounding and sensing related parameters to be applied to the one or more second links, based on the desired sounding and sensing related parameters of the first control node; transmitting the adjusted sounding and sensing related parameters to the first control node; and applying the adjusted sounding and sensing related parameters to the one or more second links.

Preferably, the desired sounding and sensing related parameters of the first control node comprise a first sounding and sensing resource parameter for specifying a first sounding and sensing window. The sounding and sensing related parameters to be applied to the one or more second links comprise a second sounding and sensing resource parameter for specifying a second sounding and sensing window. Adjusting sounding and sensing related parameters to be applied to the one or more second links includes: defining a window aligned with the first sounding and sensing window as a sensing window for the two or more second radio nodes sensing a sounding signal transmitted by the one or more first radio nodes.

Preferably, adjusting sounding and sensing related parameters to be applied to the one or more second links further includes: adjusting the second sounding and sensing window so that the second sounding and sensing window is orthogonal and adjacent to the first sounding and sensing window.

Preferably, adjusting sounding and sensing related parameters to be applied to the one or more second links further includes: adjusting the first and second sounding and sensing windows so that there is an aligned window between the first and second sounding and sensing windows. The aligned window is allocated to one or more second links in the second network, which are not affected by the first network, as well as to one or more first links in the first network, which are not affected by the second network.

Preferably, a size of the aligned window is negotiated between the first control node and the second control node.

Preferably, the method further includes: receiving one or more sensing results from each of the two or more second radio nodes serving a receiving node of a link in the second network; and determining a Directional Link Interference Map (DLIM) based on the received one or more sensing results.

According to a third aspect of the present disclosure, there is proposed a first control node controlling one or more first links among two or more first radio nodes in a first network. The first control node includes: a transmitting unit configured to transmit desired sounding and sensing related parameters of the first control node to a second control node controlling one or more second links among two or more second radio nodes in a second network neighboring the first network and operating at the same frequency as the first network; a receiving unit configured to receive, from the second control node, sounding and sensing related parameters to be applied to the one or more second links, which are adjusted based on the desired sounding and sensing related parameters of the first control node; an adjusting unit configured to adjust the desired sounding and sensing related parameters of the first control node, based on the sounding and sensing related parameters to be applied to the one or more second links; and an applying unit configured to apply the adjusted desired sounding and sensing related parameters to the one or more first links.

According to a fourth aspect of the present disclosure, there is proposed a second control node controlling one or more second links among two or more second radio nodes in a second network. The second control node includes: a receiving unit configured to receive, from a first control node controlling one or more second links among two or more first radio nodes in a first network neighboring the second network and operating at the same frequency as the second network, desired sounding and sensing related parameters of the first control node; an adjusting unit configured to adjust sounding and sensing related parameters to be applied to the one or more second links, based on the desired sounding and sensing related parameters of the first control node; a transmitting unit configured to transmit the adjusted sounding and sensing related parameters to the first control node; and an applying unit configured to apply the adjusted sounding and sensing related parameters to the one or more second links.

According to a fifth aspect of the present disclosure, there is proposed a computer program product storing instructions that when executed, cause one or more computing devices to perform the method of the first aspect or the second aspect.

According to the present disclosure, sounding and sensing related parameters are coordinated between two different networks. In this manner, receivers of all links within one network may be in a directional sensing state (i.e., in RX state) when their corresponding transmitters are transmitting directional sounding signals (i.e., in TX state). This facilitates measurements on the inter-network inter-link interference, while improving interference measurement accuracy.

BRIEF DESCRIPTION

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 1 schematically shows one example MMW RAT network.

FIG. 5 illustrates an example of a complex interference situation in a MMW-RAT network.

FIG. 6 shows a typical scenario of inter-network inter-link interference between two spectrum sharing MMW RAT networks.

FIG. 19 illustrates an example of the adjusted first and second ADSS patterns according to embodiments of the present disclosure.

FIG. 20 shows a flowchart of a method 2000 performed in a first control node according to embodiments of the present disclosure.

Figure 24:
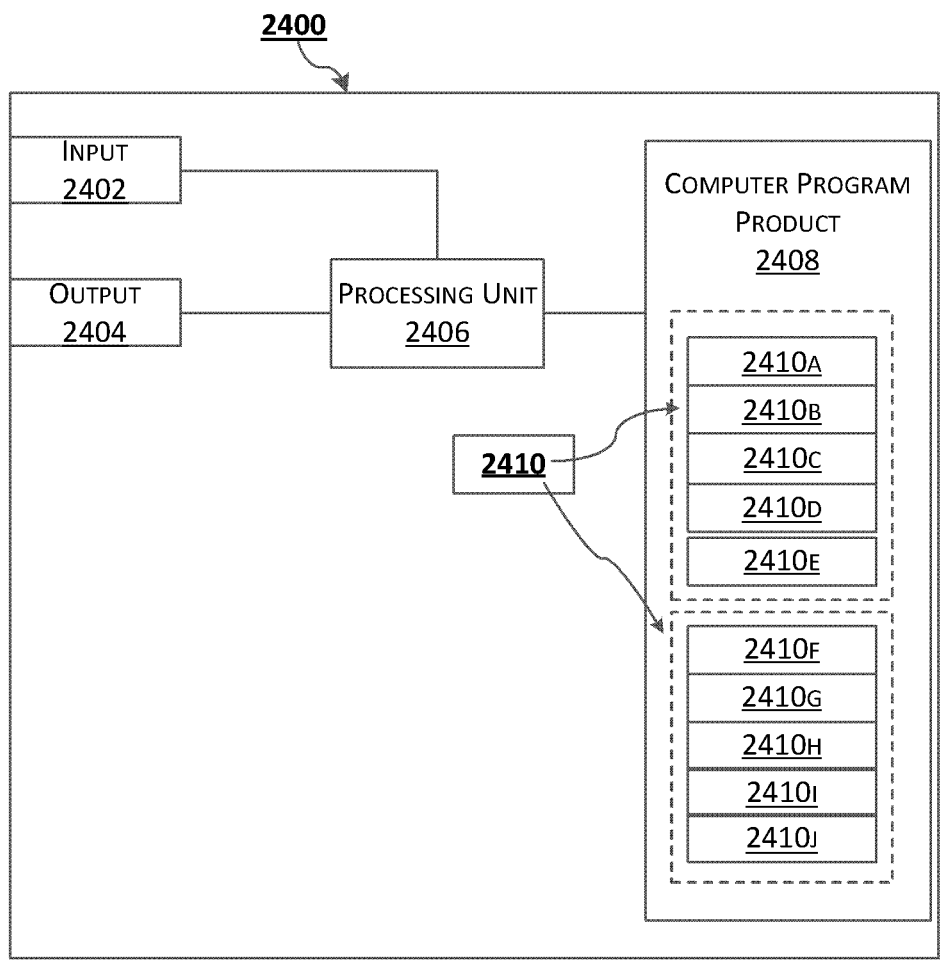

FIG. 24 schematically shows an embodiment of an arrangement 2300 which may be used in the first control node 2200 or the second control node 2300 according to the present disclosure.

DETAILED DESCRIPTION OF EMBODIMENTS

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

First of all, considering inter-link within, e.g., one MMW RAT network, the present disclosure proposes to align directional sounding and sensing parameters. Such a solution may be referred to as Aligned Directional Sounding and Sensing (ADSS), and sounding and sensing parameters for a network that have been subject to such a solution may be referred to as a ADSS pattern hereinafter. To be specific, the present disclosure configures a transmitter of each link (i.e., link transmitter and receiver) with a time-frequency radio resource pattern to send directional sounding beam in its link direction, and correspondingly configures a receiver of each link with the same time-frequency radio resource pattern to directionally monitor all possible sounding signals in its link directions. Such a time-frequency radio resource pattern is an ADSS pattern for the network. Thereby, receivers of all links may be in a directional sensing state when their corresponding transmitters are sending directional sounding signals. In this way, the victim links and the interfering links can be accurately identified and the mutual interference levels can be measured. That is, an effective inter-link interference map (also referred to as Directional Link Interference Map, i.e. DLIM) of an MMW RAT network can be derived for indicating the intra-network inter-link interference. Such measurement information can be used to enhance the resource allocation schemes, e.g., time, frequency and transmit power resource.

Figure 7:
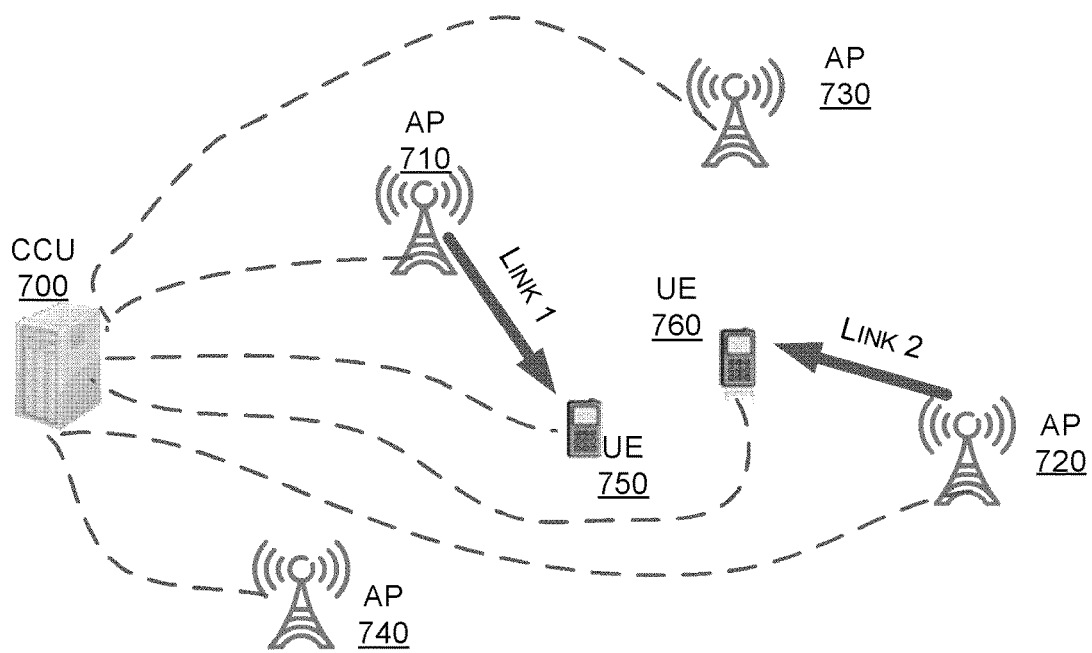
FIG. 7 depicts an example of a wireless communication network in which ADSS may be implemented.

FIG. 7 depicts an example of a wireless communication network in which ADSS may be implemented. The wireless communication network comprises a Central Control Unit (CCU) 700 and a plurality of radio nodes (also referred to as access nodes (ANs)) whereof six ANs are depicted in FIG. 7. The CCU 700 may be a Node B, a Base Station (BS), an eNB, an eNodeB, an Home Node B, an Home eNode B, a relay node, an AP or any other control node or network node at least responsible for parameter configurations and coordination among ANs as well as controlling radio links among ANs, in any wireless system or cellular network, such as an LTE network, any 3rd Generation Partnership Project (3GPP) cellular network, an MWV network, a Wimax network, a WLAN/Wi-Fi, a WPAN etc. Each radio node may e.g., be a wireless device, a mobile wireless terminal or a wireless terminal, a mobile phone, a computer such as a laptop, a Personal Digital Assistants (PDAs) or a tablet computer, sometimes referred to as a phablet, with wireless capability (the foregoing ones may be collectively known as a UE), a sensor or actuator with wireless capabilities or any other radio network units capable to communicate over a radio link in a wireless communication network. It should be noted that the term "radio node" or "AN" used in this document also covers other wireless devices such as Machine to Machine (M2M) devices, also denoted Machine Type Communication (MTC) devices. In this example, four ANs are exemplified as APs, i.e., AP 710, AP 720, AP 730, and AP 740, and two ANs are exemplified as UEs, i.e., UE 750 and UE 760. Furthermore, each AN can be regarded as either a transmitting node or a receiving node in different radio links. For example, in a link on which AP 710 transmits data to UE 750, AP 710 is a transmitting node, and UE 750 is a receiving node. In contrast, in a link on which AP 710 receives data from UE 750, AP 710 is a receiving node, and UE 750 is a transmitting node. To put it differently, a radio node or an AN may be either a client radio node or a server radio node, depending on its role. For example, if a radio node is UE 760 as shown in FIG. 7, AP 720 serves its server radio node. It is also possible that a UE may play a role of a server radio node when the UE serves as a hot point and serves other UEs. In this case, the server radio node is the UE, and client radio nodes may be other UEs served by the UE.

Figure 8:
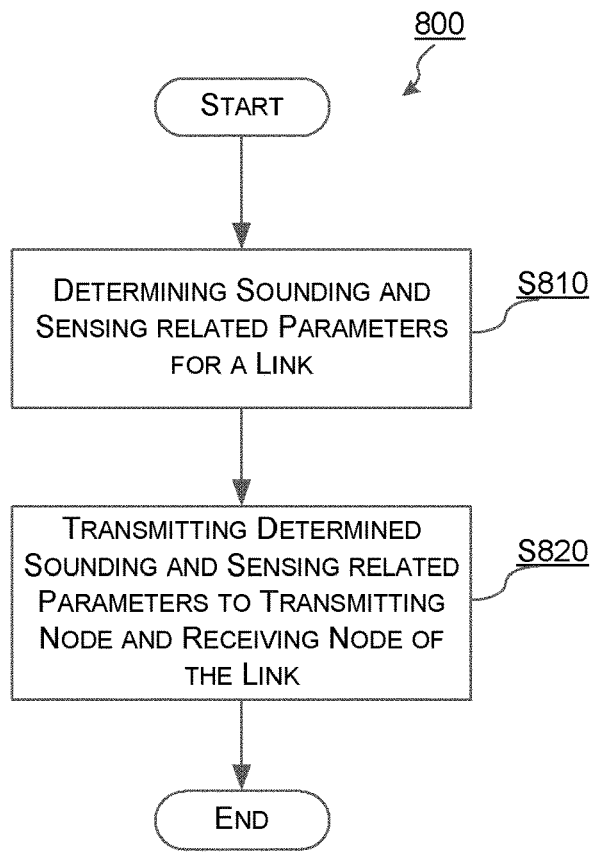
FIG. 8 shows a flowchart of a method 800 performed in a control node according to embodiments of the present disclosure.

FIG. 8 shows a flowchart of a method 800 performed in a control node, e.g., CCU 700 in FIG. 7, according to embodiments of the present disclosure. To be specific, the method 800 is used for implementing ADSS at network side.

At step S810, the control node determines sounding and sensing related parameters for a link, e.g., a radio link between AP 710 and UE 750 as shown in FIG. 7. The determined sounding and sensing related parameters include dedicated sounding and sensing related parameters for the link and common sounding and sensing related parameters for all links controlled by the control node. The common sounding and sensing related parameters include a sounding and sensing period and a sounding and sensing interval (i.e., a duration for sounding and sensing).

As a feasible implementation, the control node may determine the sounding and sensing related parameters upon receipt of a setup request for the link from, e.g., either end of the link, e.g., AP 710 or UE 750, etc.

At step S820, the control node transmits the determined sounding and sensing related parameters to a transmitting node and a receiving node of the link. For example, the transmitting node is AP 710 and the receiving node is UE 750, as shown in FIG. 7.

In an implementation, the common sounding and sensing related parameters may further include: a rule for the receiving node reporting its sensing result to the control node.

In another implementation, the dedicated sounding and sensing related parameters for the link may include a sounding resource parameter for specifying a sounding resource element for the transmitting node transmitting a sounding signal. The specified sounding resource element is in terms of at least one or more of: time, frequency, and code.

In another implementation, the method 800 may further include the following steps (not shown) of: receiving one or more sensing results from all receiving nodes of all links under control of the control node; determining a DLIM based on the received one or more sensing results; and determining a resource allocation scheme or a resource allocation strategy for data transmission in all links controlled by the control node based on the determined DLIM.

One major advantage with the method 800 is receiving nodes of all links may be in a directional sensing state when the transmitting nodes of their neighboring links are sending directional sounding signals. This enables one link to identify all interfering links and measure the interference level from these interfering links, based on which the network can efficiently improve spatial reuse of frequency resources while avoiding and/or controlling collisions among different links.

Figure 9:
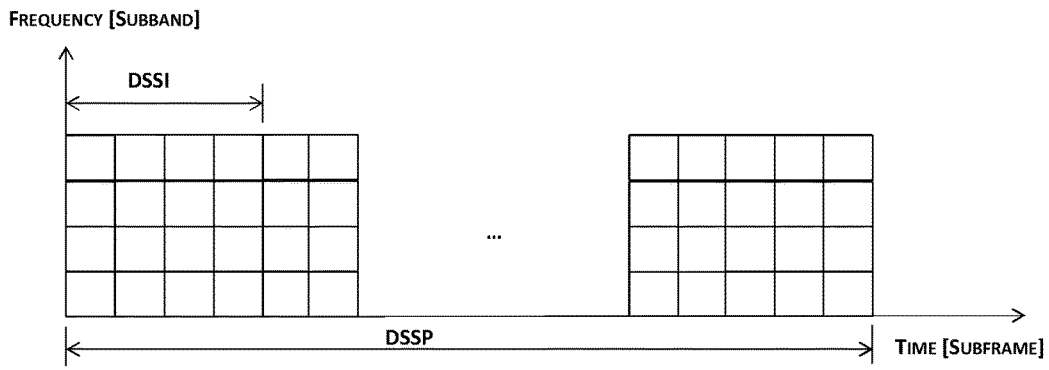
FIG. 9 illustrates a general sounding and sensing resource allocation structure according to embodiments of the present disclosure.

FIG. 9 illustrates a general sounding and sensing resource allocation structure according to embodiments of the present disclosure.

Figure 11:
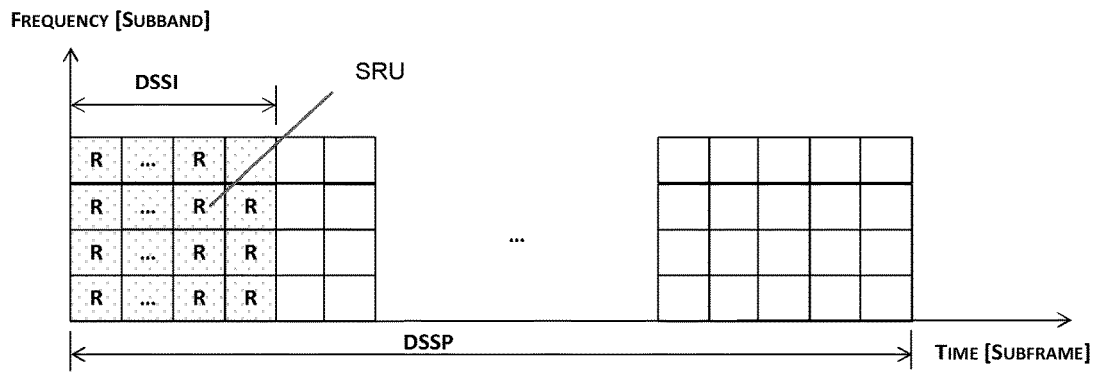
FIG. 11 illustrates an example sensing resource allocation structure according to embodiments of the present disclosure.
Figure 13:
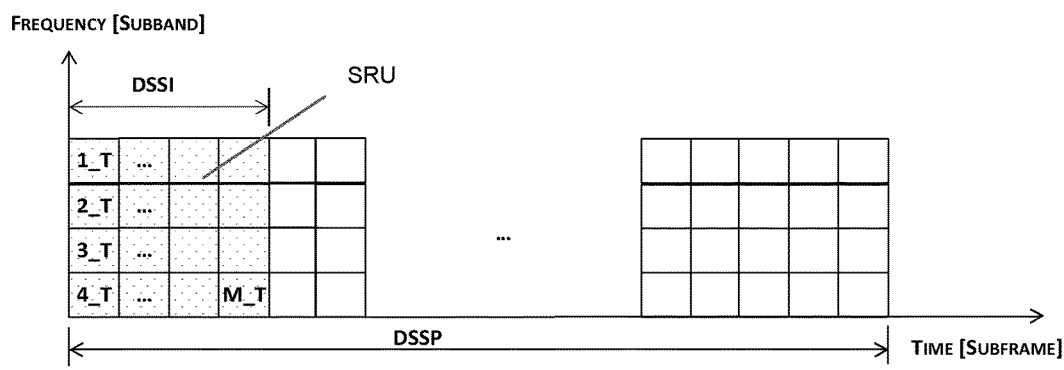
FIG. 13 illustrates an example sounding resource allocation structure according to embodiments of the present disclosure.

As shown in FIG. 9, Directional Sounding and Sensing Period (DSSP) denotes a sounding and sensing period, and Directional Sounding and Sensing Interval (DSSI) denotes a sounding and sensing interval, i.e., a window/a duration for sounding and sensing. The DSSP and DSSI are common sounding and sensing related parameters for all links controlled by the control node, and may be determined by the control node as an ADSS pattern. For example, the ADSS pattern may indicate the sensing resource allocation structure as shown in FIG. 11 and the sounding resource allocation structure as shown in FIG. 13.

The DSSP and DSSI are mainly in terms of time domain. For example, the DSSP and DSSI both refer to time windows. In this case, a transmitting node of each link may transmit a sounding signal to a receiving node of the link in a direction of the link during a time window defined by the DSSI, and the receiving node senses all sounding signals in a direct of the link during the same time window. Thereby, inter-link interferences, e.g., DL-DL interference between link 5 and link 6 as shown in FIG. 5, can be sensed in an efficient manner.

Optionally, the DSSP and DSSI may be further in terms of frequency domain. For example, the DSSI may further define one or more sub-bands to be used by the transmitting node/the receiving node of the link.

Within the DSSI, there are a number of sounding and sensing resource elements, some of which are allocated to a link for transmitting a sounding signal by means of dedicated sounding and sensing related parameters and thus are called as Sounding Resource Units (SRUs). One sounding and sensing resource element may be defined in terms of at least one or more of: time, frequency, and code. For example, one sounding and sensing resource element may be defined as one time-frequency resource unit plus an orthogonal sequence. This means that multiple sounding signals may be multiplexed over one time-frequency unit by using orthogonal sequences.

In practice, the DSSI length may be determined based on the link density in the network and the DSSP length may be short enough to track the TX/RX beam change of links, including both TX/RX direction change and TX power change.

An exemplary DLIM may be described by referring to FIG. 5. As shown in FIG. 5, the DLIM can indicate the received sounding signal power from the transmitter of each link (Link i, e.g., any one of links 1-6 as shown in FIG. 5) and the received sounding signal strengths from other links whose sounding signals are detected by the link (Link i) receiver.

The DLIM may identify whether a transmitter of a first link contributes considerable interference to a receiver of a second link. If there is considerable interference contributed, the interference level and the corresponding link identity are included in the DLIM. Relying the sounding signals (SRU) and corresponding signal strengths reported from a receiver, the control node can identify the links and corresponding interference levels to the receiver.

For example, the DLIM may be updated upon receipt of a new directional sounding report from a receiver, or upon link setup/link release.

With such DLIM, the present disclosure can enhance the radio resource allocation (e.g. time, frequency and TX power resource), so that the spatial reuse can be efficiently and sufficiently improved.

Figure 10:
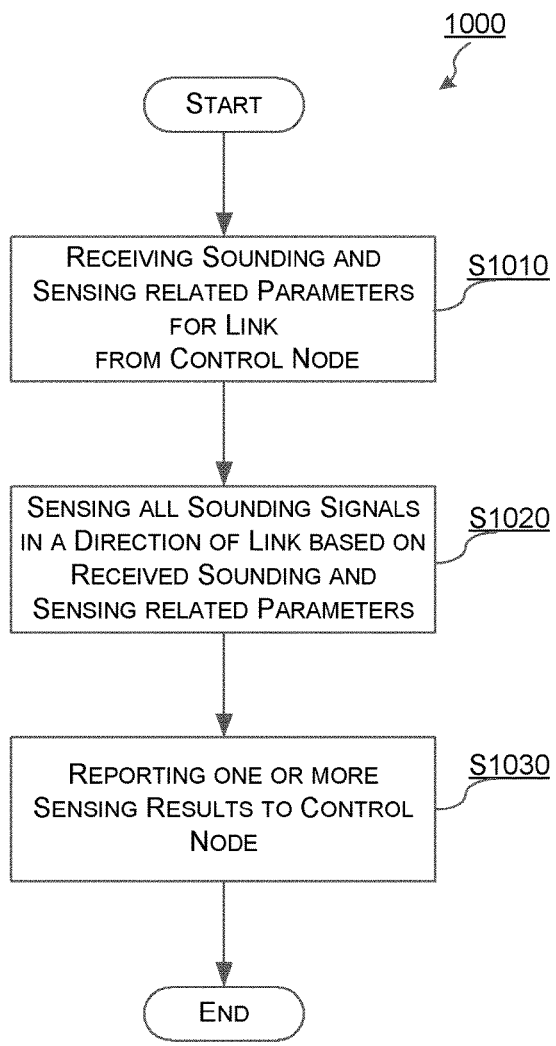
FIG. 10 shows a flowchart of a method 1000 performed in a receiving node of a link according to embodiments of the present disclosure.

FIG. 10 shows a flowchart of a method 1000 performed in a receiving node of a link, such as a radio link between AP 710 and UE 750 as shown in FIG. 7, according to embodiments of the present disclosure. To be specific, the method 1000 is used for performing ADSS at receiving side. In this case, the receiving node may be AP 710 or UE 750. For illustration, UE 750 is taken as the receiving node here, and correspondingly AP 710 serves as a corresponding transmitting node for the receiving node, and vice versa.

At step S1010, UE 750 receives sounding and sensing related parameters for the link from a control node, e.g., the CCU 700 in FIG. 7. The received sounding and sensing related parameters include dedicated sounding and sensing related parameters for the link and common sounding and sensing related parameters for all links controlled by the control node. The common sounding and sensing related parameters include a sounding and sensing period and a sounding and sensing interval.

At step S1020, UE 750 senses all sounding signals in a direction of the link based on the received sounding and sensing related parameters.

At step S1030, UE 750 reports one or more sensing results to the control node.

In an implementation, the common sounding and sensing related parameters further include: a rule for UE 750 reporting the one or more sensing results to the control node.

During the sounding interval, all receiving nodes shall be in blindly monitoring state in its link direction. Each receiving node shall target its RX beam in an incoming direction of its link. In order to leave some room for the RX beam adjustment during one sounding period, the RX beam for directional sensing could be wider than the RX beam for actual data receiving.

Via blind detection, the receiving node may determine information on SRU of the detected sounding signals. This information shall be reported to the control node for possible interfering transmitter identification. Moreover, the receiving node may further measure the strength of each detected sounding signal. This measurement result shall be reported to the CCU to derive the DLIM, which can be used to determine the maximum allowed TX power for a transmitter or interference coordination pattern in order to control the interference.

FIG. 11 illustrates an example sensing resource allocation structure according to embodiments of the present disclosure. As shown in FIG. 11, each receiving node may sense all possible sounding signals in its link direction over all SRUs during the DSSI.

One major advantage with the method 1000 is that the receiving node can sense all sounding signals in a direction of the link in a time window during which the transmitting nodes of the neighboring links are transmitting sounding signals. When the method 1000 is applied in two neighboring links, interference between these two links can be sensed in an efficient manner.

Figure 12:
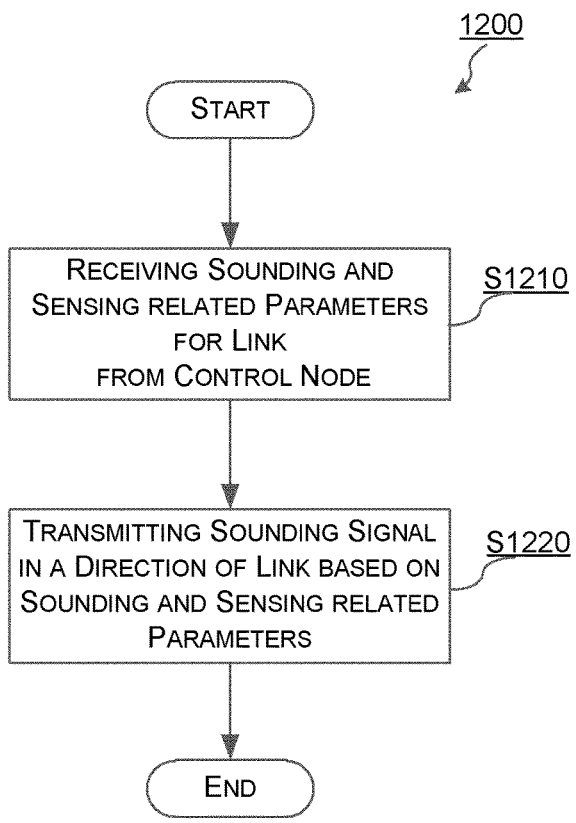
FIG. 12 shows a flowchart of a method 1200 performed in a transmitting node of a link according to embodiments of the present disclosure.

FIG. 12 shows a flowchart of a method 1200 performed in a transmitting node of a link, such as a radio link between AP 710 and UE 750 as shown in FIG. 7, according to embodiments of the present disclosure. To be specific, the method 1200 is used for performing ADSS at transmitting side. In this case, the transmitting node may be AP 710 or UE 750. For illustration, AP 710 is taken as the transmitting node here, and correspondingly UE 750 serves as a corresponding receiving node for the transmitting node, and vice versa.

At step S1210, AP 710 receives sounding and sensing related parameters for the link from a control node, e.g., the CCU 700 as shown in FIG. 7. The received sounding and sensing related parameters include dedicated sounding and sensing related parameters for the link and common sounding and sensing related parameters for all links controlled by the control node. The common sounding and sensing related parameters include a sounding and sensing period and a sounding and sensing interval, e.g., DSSP and DSSI as shown in FIG. 9.

At step S1220, AP 710 transmits a sounding signal in a direction of the link based on the sounding and sensing related parameters.

In an implementation, the dedicated sounding and sensing related parameters for the link include a sounding resource parameter for specifying a sounding resource element for the transmitting node transmitting the sounding signal. The specified resource unit is in terms of at least one or more of: time, frequency and code.

FIG. 13 illustrates an example sounding resource allocation structure according to embodiments of the present disclosure.

As shown in FIG. 13, each transmitting node may be allocated with one SRU, and there are totally M transmitters controlled by the control node, e.g., the CCU 700 as shown in FIG. 7. Optionally, each SRU may be also defined in terms of frequency. For example, each SRU may occupy one sub-band.

One major advantage with the method 1200 is that the transmitting node can transmit a sounding signal in a direction of the link in a time window during which the receiving nodes of itself and its neighboring links are sensing the sounding signal. When the method 1200 is applied in two neighboring links, interference between these two links (i.e., inter-link interference within one network) can be sensed in an efficient manner.

The present disclosure further proposes to coordinate directional sounding and sensing parameters (or ADSS patterns) between two spectrum sharing networks, e.g., two spectrum sharing MMW RAT networks, in such a manner that receiving nodes of all links within one network may be in a directional sensing state (i.e., in RX state) when transmitting nodes of all links within the other network are transmitting directional sounding signals (i.e., in TX state). Then, the inter-network inter-link interference can be measured. In this regard, DLIM presenting both of the intra-network inter-link interference and the inter-network inter-link interference may be derived at each network side, thereby improving interference measurement accuracy.

Figure 14:
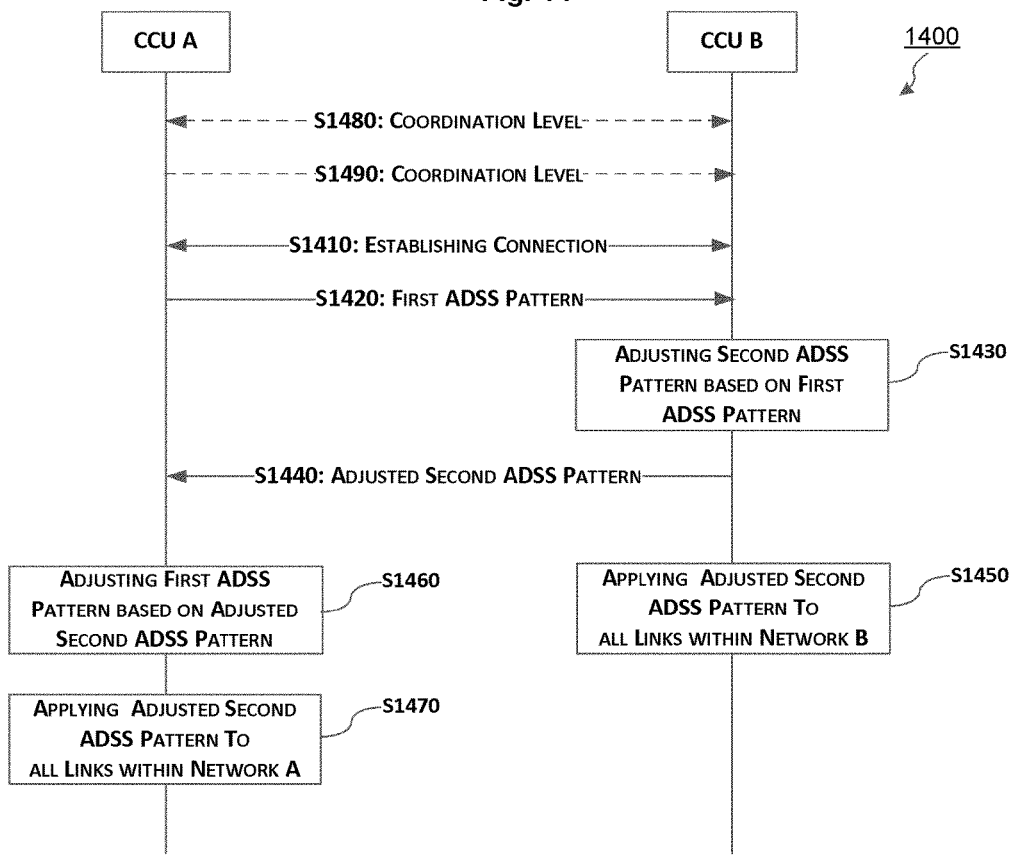
FIG. 14 illustrates a flow sequence of a procedure 1400 for coordinating directional sounding and sensing parameters between two spectrum sharing networks according to an embodiment of the present disclosure.

FIG. 14 illustrates a flow sequence of a procedure 1400 for coordinating directional sounding and sensing parameters between two spectrum sharing networks according to an embodiment of the present disclosure. For example, this procedure may be applied in the scenario as shown in FIG. 6. It is assumed that Network A is under control of a control node, called as CCU A, and Network B is under control of a control node, called as CCU B. That is, AN 1 and UE 1 located within Network A are under control of CCU A, and AN 2 and UE 2 located within Network B are under control of CCU B. For example, CCU A and CCU B may belong to two operators of these two networks, respectively.

First of all, a connection should be established between Network A and Network B (step S1410), so that CCU A and CCU B can communicate with each other. This operation may be initiated by either CCU A or CCU B. For sake of explanation, it is assumed here that CCU A initiates the establishment of the connection. It should be noted that roles of CCU A and CCU B can be interchangeable.

At step S1420, CCU A transmits to its desired sounding and sensing related parameters (represented by a first ADSS pattern) to CCU B. The CCU A's desired sounding and sensing related parameters include a first sounding and sensing resource parameter for specifying a first sounding and sensing window, i.e., DSSI per DSSP for Network A. It is assumed that DSSI and DSSP for Network A are referred to as a first DSSI and a first DSSP, respectively. That is, the first ADSS pattern indicates the first DSSI and the first DSSP. For example, the first ADSS pattern may indicate the sensing resource allocation structure as shown in FIG. 11 and the sounding resource allocation structure as shown in FIG. 13.

At step S1430, CCU B adjusts its own sounding and sensing related parameters (represented by a second ADSS pattern), based on the received CCU A's desired sounding and sensing related parameters. The CCU B's own sounding and sensing related parameters include a second sounding and sensing resource parameter for specifying a second sounding and sensing window, i.e., DSSI per DSSP for Network B. It is assumed that DSSI and DSSP for Network B are referred to as a second DSSI and a second DSSP, respectively. That is, the second ADSS pattern indicates the second DSSI and the second DSSP. For example, the second ADSS pattern may indicate the sensing resource allocation structure as shown in FIG. 11 and the sounding resource allocation structure as shown in FIG. 13.

It should be noted that DSSP is not mandatory to be the same for different networks and can be in integer times relation. For example, the first DSSP=N frames, while the second DSSP=2*N frames.

At step S1440, CCU B transmits its own adjusted sounding and sensing related parameters (i.e., the adjusted second ADSS pattern) to CCU A.

At step S1450, CCU B applies its own adjusted sounding and sensing related parameters to all links within Network B.

It should be noted that step S1450 may also occur before step S1440 or at the same time with step S1440.

At step S1460, CCU A adjusts its own desired sounding and sensing related parameters, based on the CCU B's adjusted sounding and sensing related parameters.

At step S1470, CCU A applies the adjusted desired sounding and sensing related parameters to all links within Network A.

Thereafter, CCU A may receive one or more sensing results from each of the two or more first radio nodes serving a receiving node of a link in Network A, and then determine a DLIM based on the received one or more sensing results. It should be noted that the DLIM determined in this way can involve inter-network inter-link interference and intra-network inter-link interference.

Similarly, CCU B may receive one or more sensing results from each of the two or more second radio nodes serving a receiving node of a link in Network B, and then determine a DLIM based on the received one or more sensing results. In this way, the DLIM can involve inter-network inter-link interference and intra-network inter-link interference.

Figure 15:
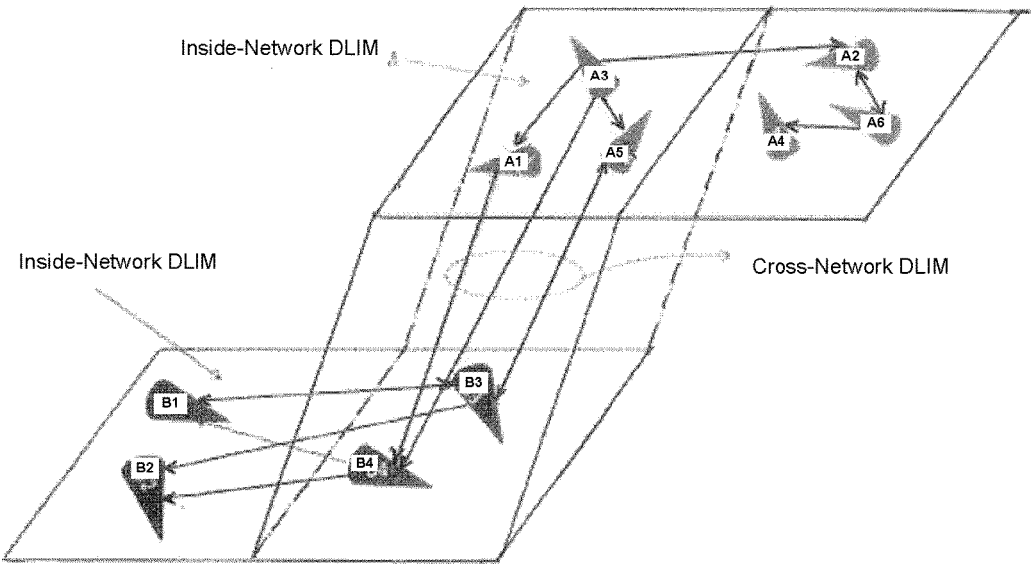
FIG. 15 illustrates a diagram showing examples of DLIMs determined by CCU A and CCU B, respectively, according to embodiments of the present disclosure.

FIG. 15 illustrates a diagram showing examples of DLIMs determined by CCU A and CCU B, respectively, according to embodiments of the present disclosure.

As illustrated in FIG. 15, there are six links in Network A, including Links A1-A6, and there are four links in Network B, including Links B1-B4. The DLIM for Network A involves inside-network DLIM indicating intra-network inter-link interferences and cross-network DLIM indicating inter-network interlink interferences from Network B to Network A. The inside-network DLIM shows there are interferences from that Link A3 to Links A1, A2 and A5, from Link A2 to Link A6, and from Link A6 to Links A2 and A4. Similarly, the DLIM for Network B involves inside-network DLIM, which shows that there are interferences from Link B1 to Link B3, from Link B3 to Links B1 and B2, and from Link B4 to Links B1 and B2. The cross-network DLIM indicates inter-network interlink interferences from Network B to Network A, i.e., showing that there are interferences from A1 to B4, from A3 to B4, from A5 to B3, and from B3 to A5.

By utilizing such DLIMs, the present disclosure can enhance the radio resource allocation (e.g. time, frequency and TX power resource), so that the spatial reuse can be efficiently and sufficiently improved.

In a first feasible implementation, at step S1430, CCU B adjusts its own sounding and sensing related parameters by defining a window aligned with the first DSSI as a sensing window for use in Network B. For example, AN2 and/UE 2 may sense a sounding signal transmitted by AN 1 and/or UE 1 during such a window. Correspondingly, at step S1460, CCU A adjusts its desired sounding and sensing related parameters by defining a window aligned with the second DSSI as a sensing window for use in Network A, e.g., during which, AN 1 and/or UE 1 may sense a sounding signal transmitted by AN 2 and/or UE 2.

According to the first feasible implementation, the first and second DSSIs are not changed.

Figure 16:
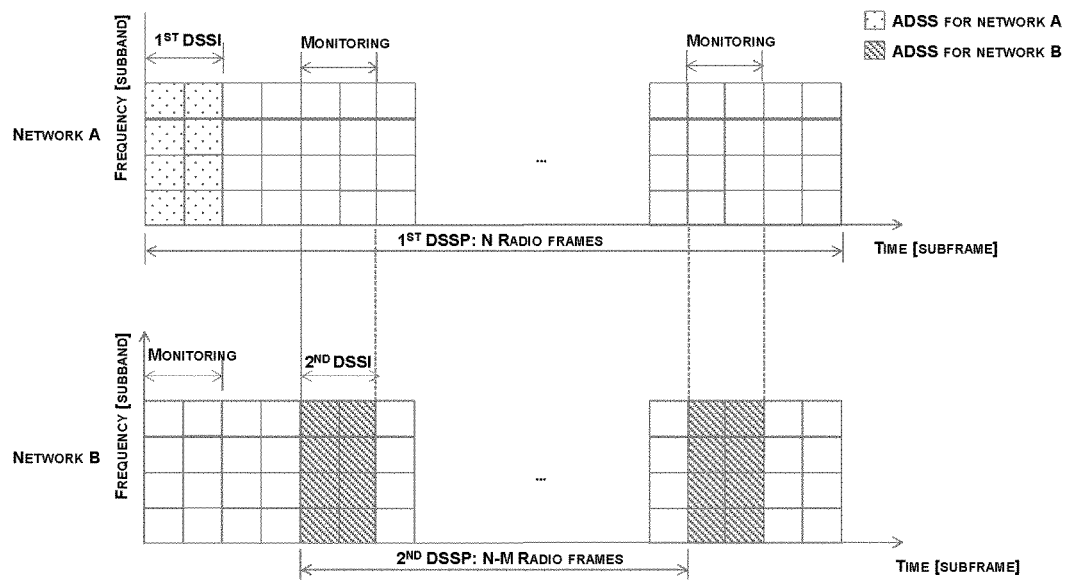
FIG. 16 illustrates an example of the adjusted first and second ADSS patterns according to embodiments of the present disclosure.

FIG. 16 illustrates an example of the adjusted first and second ADSS patterns according to embodiments of the present disclosure.

As shown in FIG. 16, in addition to having the first DSSI unchanged, the adjusted first ADSS pattern further indicates a first monitoring window aligned with the second DSSI. That is, the first monitoring window and the second DSSI occupy the same SRUs. With the adjusted first ADSS pattern, receivers of all links within Network A will be configured to perform sensing during the first monitoring window. That is, in addition to performing sounding and sensing during the first DSSI, receivers of all links within Network A will perform sensing during the first monitoring window.

Similarly, in addition to having the second DSSI unchanged, the adjusted second ADSS pattern further indicates a second monitoring window aligned with the first DSSI. That is, the second monitoring window and the first DSSI occupy the same SRUs. With the adjusted second ADSS pattern, receivers of all links within Network B will be configured to perform sensing during the second monitoring window. That is, in addition to performing sounding and sensing during the second DSSI, receivers of all links within Network B will perform sensing during the second monitoring window.

It should be noted that the first and second monitoring windows as shown in FIG. 16 are depicted for illustration, and the present disclosure should not be limited thereto.

Figure 17:
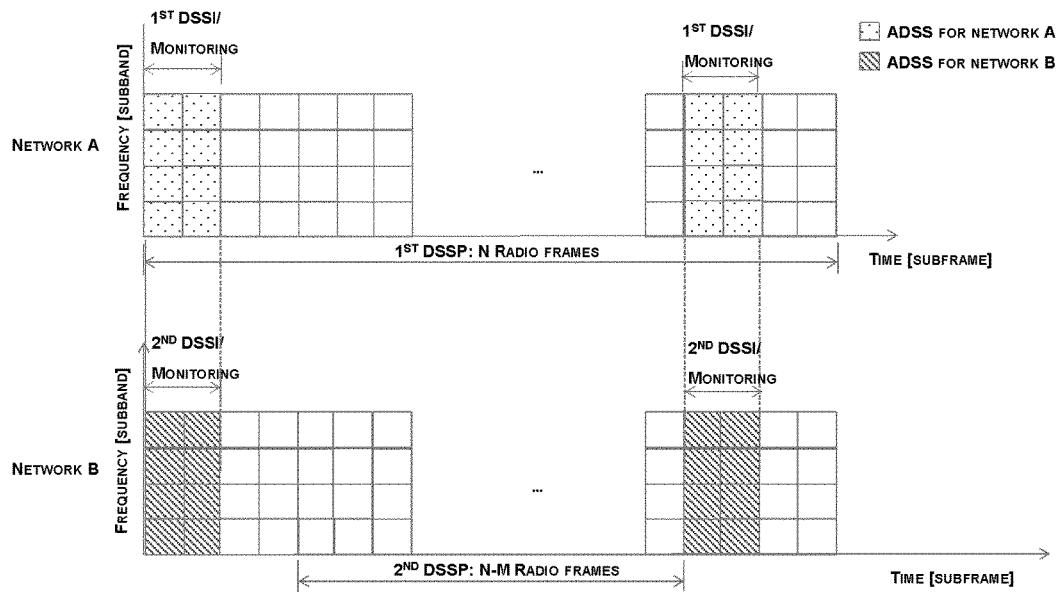
FIG. 17 illustrates an extreme variant of the example as shown in FIG. 16.

FIG. 17 illustrates an extreme variant of the example as shown in FIG. 16. In this example, the first DSSI and the second DSSI are aligned. That is, the first DSSI occupies the same SRUs as the second DSSI. Then, the first monitoring window may be overlapped with the first DSSI, and correspondingly the second monitoring window may be overlapped with the second DSSI. In most cases, such ADSS patterns may also work well. This is because as shown in FIG. 13, each transmitting node of a link is allocated with one SRU (e.g., the SRU denoted as 1_T is allocated to the first transmitting node), while as shown in FIG. 11, each receiving node of a link is allocated with all SRUs during the DSSI.

In a second feasible implementation, at step S1430, in addition to defining the second monitoring window aligned with the first DSSI, CCU B further adjusts the second DSSI so that the adjusted second DSSI is orthogonal and adjacent to the first DSSI. Correspondingly, at step S1460, CCU A defines the first monitoring window aligned with the adjusted second DSSI as a sensing window for use in Network A. In this implementation, the first DSSI remains unchanged.

Figure 18:
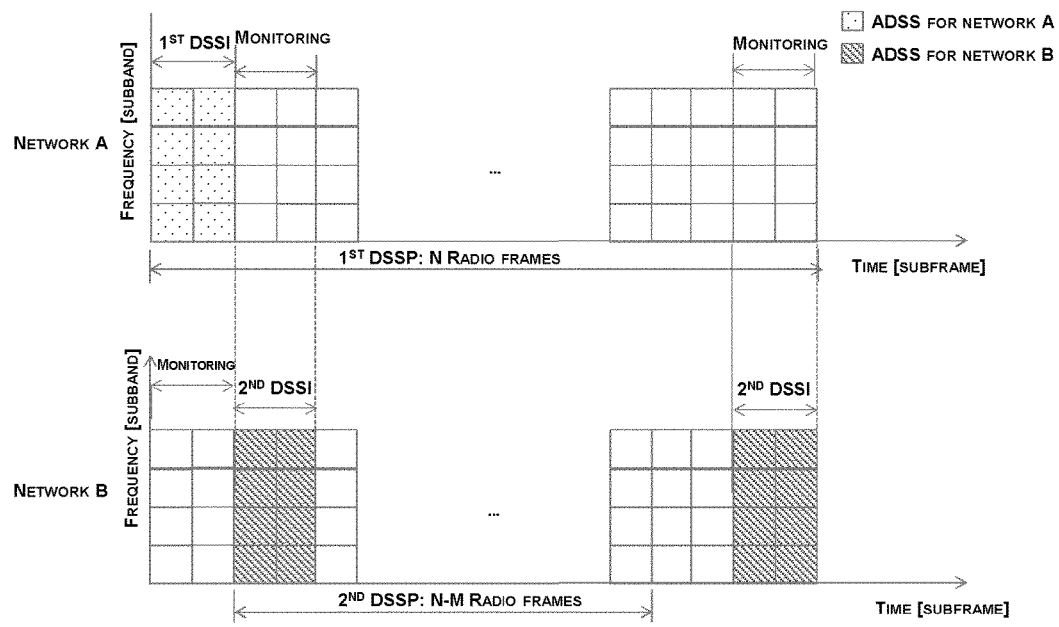
FIG. 18 illustrates an example of the adjusted first and second ADSS patterns according to embodiments of the present disclosure.

FIG. 18 illustrates an example of the adjusted first and second ADSS patterns according to embodiments of the present disclosure. It should be informed that the second DSSI as shown in FIG. 18 has been subject to the adjustment according to the second feasible implementation, i.e., actually referring to the adjusted second DSSI.

According to the adjusted first and second ADSS patterns as shown in FIG. 18, the first DSSI and the adjusted second DSSI are orthogonal and adjacent to each other. The first monitoring window is aligned with the adjusted second DSSI, and the second monitoring window is aligned with the first DSSI. If the second DSSI before the adjustment is illustrated as FIG. 16, such a second DSSI is moved to the left to form the adjusted second DSSI as shown in FIG. 18. As illustrated, the first DSSP and the second DSSP may be different, e.g., the first DSSP=N frames, while the second DSSP=2*N frames. So, it is also possible that the second DSSI is moved to the right to form the adjusted second DSSI.

With the adjusted first and second ADSS patterns, as long as transmitters of all links within Network A are in TX state, receivers of all links within Network B are in RX state, and vice versa. This can provide accurate measurements on inter-network inter-link interference.

In a third feasible implementation, at step S1430, in addition to defining the second monitoring window aligned with the first DSSI, CCU B further adjusts the second DSSI so that there is an aligned window between the first DSSI and the adjusted second DSSI. For example, if the second DSSI is illustrated as FIG. 16 or FIG. 18, CCU B may move the second DSSI to the left until a part of the second DSSI is aligned with a part of the first DSSI. CCU B allocates the aligned window to one or more second links in Network B, which are not affected by Network A. Similarly, CCU A may allocate the aligned window to one or more links in Network A, which are not affected by Network B. Then, at step S1460, CCU A defines the first monitoring window aligned with the adjusted second DSSI as a sensing window for use in Network A. In this implementation, the first DSSI remains unchanged.

FIG. 19 illustrates an example of the adjusted first and second ADSS patterns according to embodiments of the present disclosure. It should be informed that the second DSSI as shown in FIG. 19 has been subject to the adjustment according to the second feasible implementation, i.e., actually referring to the adjusted second DSSI.

According to the adjusted first and second ADSS patterns as shown in FIG. 19, the left half of the adjusted second DSSI is aligned with the right half of the first DSSI. In other words, the left half of the adjusted second DSSI occupies the same SRUs as the right half of the first DSSI. Thus, this part may be called as a shared window (equivalent to the aligned window mentioned above), which are shared by Network A and Network B, and the remaining part may be called as an unshared window.

To be specific, the shared window is allocated to one or more links in Network A that are not affected by Network B (i.e., links without inter-network inter-link interference from Network B) as well as to one or more links in Network B that are not affected by Network A (i.e., links without inter-network inter-link interference from Network A).

Figure 1:
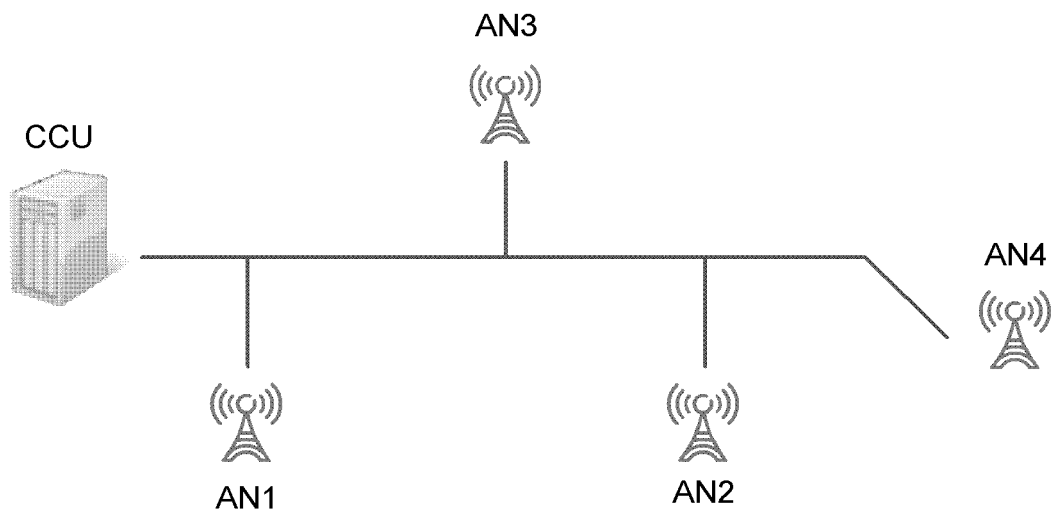
Figure 2:
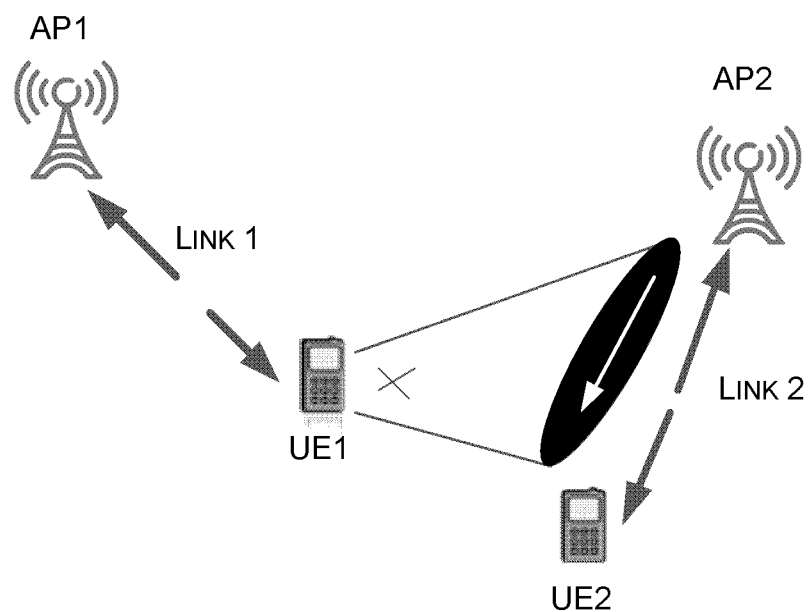
FIG. 2 illustrates an example of the hidden node problem caused by directivity of high gain beam-forming.
Figure 3:
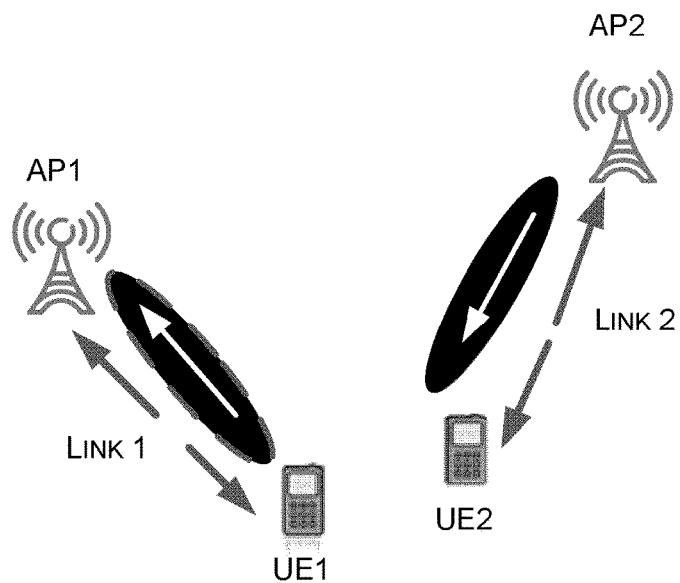
FIG. 3 illustrates an example of the deafness problem caused by directivity of high gain beam-forming.
Figure 4:
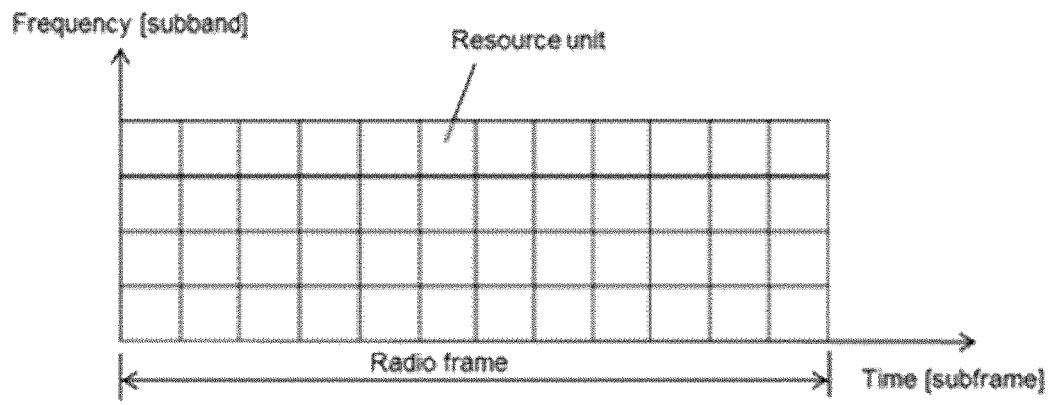
FIG. 4 illustrates one MMW-RAT carrier with 4 sub-bands.

To this end, each network could divide its all links into two groups according to results from last measurement, i.e., one link group with inter-network inter-link interference and the other link group without inter-network inter-link interference, which may be called as called an overlapping group and a non-overlapping group, respectively. For a new-coming link, it is default to be allocated into the overlapping group. For example, Links B3 and B4 as shown in FIG. 15 belong to the overlapping group, while Links B1 and B2 belong to the non-overlapping group. Links belonging to the overlapping group can only be scheduled in the unshared window to avoid deaf problem as shown in FIG. 3.

Although the shared window is illustrated as a one-subframe window in FIG. 19, it should be appreciated that this is only for illustration, and any other appropriate size of the shared window may be applicable.

To be specific, a size of the shared window may be negotiated between CCU A and CCU B. For example, such a size may be either dynamic or fixed. Moreover, the size of the shared window may depend on the total number of links involved in respective non-overlapping groups for each network. That is, the size of the shared window can be adapted to the size of overlapping group.

For example, when the connection is just established at step S1410, CCU (e.g., CCU A or CCU B) can judge which link(s) has inter-network inter-link interference. In this case, CCU can assume that all links have inter-network inter-link interference to determine a size of the shared window. After one or several rounds of sensing, CCU will know that more links only involve intra-network inter-link interference, that is, these links do not involve inter-network inter-link interference.

In this case, these links can be configured with the shared window, and correspondingly the size of the shared window will increase.

Hereinafter, descriptions will be continued by returning to FIG. 14.

First of all, it is assumed that each network has a coordination level indicating a coordination capability of the network. Different networks may have different coordination capabilities. For example, if a network can support the adjusting as illustrated in FIG. 16 or FIG. 17, it is assumed to support coordinate level of Level 1. If the network supports the adjusting as illustrated in FIG. 18, it is assumed to support coordinate level of Level 2. If the network supports the adjusting as illustrated in FIG. 19, it is assumed to support coordinate level of Level 3.

As an option, before establishing the connection at step S1410, the procedure 1400 may include coordination level negotiation between CCU A and CCU B. During the coordination level negotiation, the network capability shall be considered, for instance, one network may only support Level 1 coordination but another network may support Level 1~3. The finally determined coordination level after inter-network negotiation shall be supportable by both networks.

As shown in FIG. 14, CCU A transmits its desired coordination level to CCU B at step S1480, and in response CCU B transmits its desired coordination level to CCU A at step S1490.

In order to quickly reach the coordination level negotiation between two networks, certain rules can be predefined. Some exemplary rules are listed below, including Rule 1 and Rule 2.

According to Rule 1, proposed lower coordination level shall be applied. To be specific, when CCU B replies with a higher desired coordination level than CCU A, CCU A's desired the coordination level shall be selected as the final coordination level. When CCU B replies with a lower desired coordination level, this coordination level shall be selected. For example, if CCU A transmits Level 1 to CCU B and CCU B replies with Level 2, then Level 1 should be selected. Moreover, if CCU A transmits Level 2 to CCU B and CCU B replies with Level 1, then still Level 1 should be selected.

According to Rule 2, the selection of the final coordination level is based on coordination capability. In particular, if CCU A's desired coordination level can be supported by CCU B, this coordination level shall be selected as the final coordination level. Then, CCU B transmits the final coordination level to CCU A at step S1490. For example, if CCU A transmits Level 2 to CCU B and CCU B can support Level 2, then Level 2 should be selected.

FIG. 20 shows a flowchart of a method 2000 performed in a first control node according to embodiments of the present disclosure. The first control node controls one or more first links among two or more first radio nodes in a first network. Taking FIG. 6 as an example, the first network is Network A, the first radio nodes are AN 1 and UE 1, and the first links include Link A from AN 1 to UE 1. In this case, the first control node is CCU A for controlling Network A. The following description on the method 2000 is made by way of this example, and it should be appreciated that this is only for illustration and the present disclosure is not limited thereto.

At step S2010, CCU A transmits its desired sounding and sensing related parameters (e.g., the first ADSS pattern) to a second control node controlling one or more second links among two or more second radio nodes in a second network neighboring the first network and operating at the same frequency as the first network. Following the example as shown in FIG. 6, the second network is Network B, the second control node is CCU B for controlling Network B, the second radio nodes are AN 2 and UE 2, and the second links include Link B from AN 2 to UE 2.

At step S2020, CCU A receives, from CCU B, sounding and sensing related parameters to be applied to the one or more second links, which are adjusted based on the desired sounding and sensing related parameters of the first control node (e.g., the adjusted second ADSS pattern).

At step S2030, CCU A adjusts the desired sounding and sensing related parameters of the first control node, based on the sounding and sensing related parameters to be applied to the one or more second links. For example, CCU A adjusts the first ADSS pattern based on the adjusted second ADSS pattern.

In an implementation, the desired sounding and sensing related parameters of the first control node comprise a first sounding and sensing resource parameter for specifying a first sounding and sensing window. For example, the first ADSS pattern comprises a first ADSS. The sounding and sensing related parameters to be applied to the one or more second links comprise a second sounding and sensing resource parameter for specifying a second sounding and sensing window. For example, the second ADSS pattern comprises a second ADSS.

In this implementation, step S2020 may be implemented by defining a window aligned with the second sounding and sensing window as a sensing window for the two or more first radio nodes sensing a sounding signal transmitted by the one or more second radio nodes. For example, as shown in FIG. 16 or FIG. 17, CCU A defines the first monitoring window to form the adjusted first ADSS pattern.

At step S2040, CCU A applies the adjusted sounding and sensing related parameters to the one or more second links. For example, CCU A applies the adjusted first ADSS pattern to Link A as shown in FIG. 6.

In an implementation, the method 2000 further includes: receiving one or more sensing results from each of the two or more first radio nodes serving a receiving node of a link in the first network; and determining a DLIM based on the received one or more sensing results, e.g., the DLIM as shown in FIG. 15.

For example, with the adjusted first ADSS pattern, receivers of all links within Network A will be configured to perform sensing during the first monitoring window. Thereafter, CCU A may receive corresponding sensing results from each receiving node within Network A, and then determine a DLIM based on the received sensing results. As the inter-network inter-link interference and the intra-network inter-link interference are both considered in the adjusted first pattern, the determined DLIM can be more accurate, thereby improving interference measurement accuracy.

Figure 21:
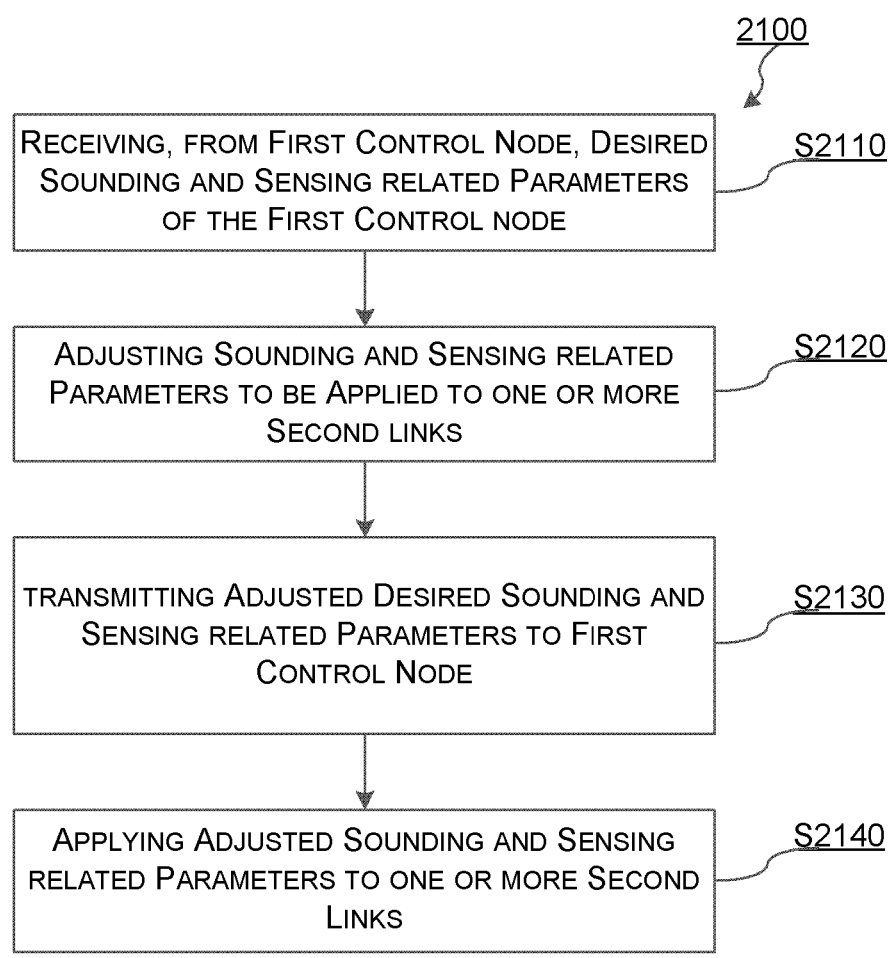
FIG. 21 shows a flowchart of a method 2100 performed in a second control node according to embodiments of the present disclosure.

FIG. 21 shows a flowchart of a method 2100 performed in a second control node according to embodiments of the present disclosure. The second control node controls one or more second links among two or more second radio nodes in a second network. Taking FIG. 6 as an example, the second network is Network B, the second radio nodes are AN 2 and UE 2, and the second links include Link B from AN 2 to UE 2. In this case, the second control node is CCU B for controlling Network B. The following description on the method 2100 is made by way of this example, and it should be appreciated that this is only for illustration and the present disclosure is not limited thereto.

At step S2110, CCU B receives from a first control node controlling one or more second links among two or more first radio nodes in a first network neighboring the second network and operating at the same frequency as the second network, desired sounding and sensing related parameters of the first control node (e.g., the first ADSS pattern). Following the example as shown in FIG. 6, the first network is Network A, the first control node is CCU A for controlling Network A, the first radio nodes are AN 1 and UE 1, and the first links include Link A from AN 1 to UE 1.

At step S2120, CCU B adjusts sounding and sensing related parameters to be applied to the one or more second links (e.g., the second ADSS pattern), based on the desired sounding and sensing related parameters of the first control node. For example, CCU B adjusts the second ADSS pattern based on the first ADSS pattern to obtain the adjusted second ADSS pattern.

In an implementation, the desired sounding and sensing related parameters of the first control node comprise a first sounding and sensing resource parameter for specifying a first sounding and sensing window. For example, the first ADSS pattern comprises the first DSSI. The sounding and sensing related parameters to be applied to the one or more second links comprise a second sounding and sensing resource parameter for specifying a second sounding and sensing window. For example, the second ADSS pattern comprises the second DSSI.

In this implementation, step S2120 may be implemented by defining a window aligned with the first sounding and sensing window as a sensing window for the two or more second radio nodes sensing a sounding signal transmitted by the one or more first radio nodes. For example, as shown in FIG. 16 or FIG. 17, CCU B defines the second monitoring window to form the adjusted second ADSS pattern.

Alternatively, step S2120 may be implemented by adjusting the second sounding and sensing window so that the second sounding and sensing window is orthogonal and adjacent to the first sounding and sensing window. For example, as shown in FIG. 18, in addition to defining the second monitoring window, CCU B further adjusts the second DSSI, e.g., by moving the second DSSI to the left in time axis, so that the adjusted second DSSI are orthogonal and adjacent to the first DSSI.

Alternatively, step S2120 may be implemented by adjusting the first and second sounding and sensing windows so that there is an aligned window between the first and second sounding and sensing windows. The aligned window is allocated to one or more second links in the second network, which are not affected by the first network, as well as to one or more first links in the first network, which are not affected by the second network. For example, as shown in FIG. 19, in addition to defining the second monitoring window, CCU B further adjusts the second DSSI, e.g., by moving the second DSSI to the left in time axis, so that the left half of the adjusted second DSSI is aligned with the right half of the first DSSI. This aligned window may be shared by Network A and Network B, and are allocated to links in Network A without inter-network inter-link interference from Network B, as well as to links in Network B without inter-network inter-link interference from Network A.

A size of the aligned window may be negotiated between CCU A and CCU B. For example, such a size may be either dynamic or fixed. Moreover, the size of the shared window may depend on the total number of links in one network without inter-network inter-link interference from the other network.

At step S2130, CCU B transmits the adjusted sounding and sensing related parameters to CCU A. For example, CCU B transmits the adjusted second ADSS pattern to CCU A.

At step S2140, CCU B applies the adjusted sounding and sensing related parameters to the one or more second links. For example, CCU B may apply the adjusted second ADSS pattern to Link B as shown in FIG. 6.

It should be noted that step S2140 may also occur before step S2130 or at the same time with step S2130.

In another implementation, the method 2100 further includes: receiving one or more sensing results from each of the two or more second radio nodes serving a receiving node of a link in the second network; and determining a DLIM based on the received one or more sensing results, e.g., the DLIM as shown in FIG. 15.

For example, with the adjusted second ADSS pattern, receivers of all links within Network B will be configured to perform sensing during the second monitoring window. Thereafter, CCU B may receive corresponding sensing results from each receiving node within Network B, and then determine a DLIM based on the received sensing results. As the inter-network inter-link interference and the intra-network inter-link interference are both considered in the adjusted first pattern, the determined DLIM can be more accurate, thereby improving interference measurement accuracy.

Figure 22:
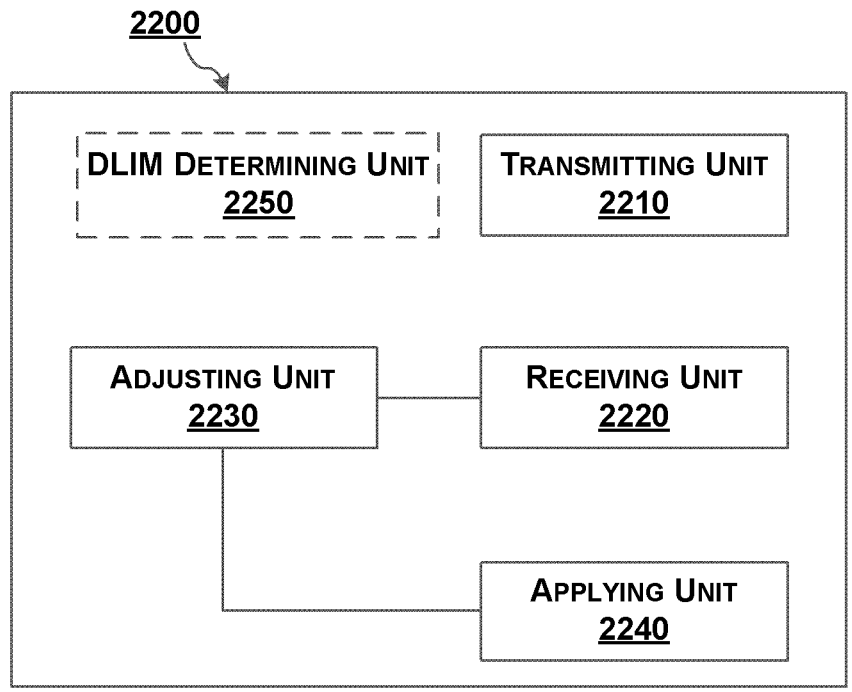
FIG. 22 is a schematic block diagram of a first control node 2200 according to the present disclosure.

FIG. 22 is a schematic block diagram of a first control node 2200 according to the present disclosure. The first control node 2200 controls one or more first links among two or more first radio nodes in a first network. Taking FIG. 6 as an example, the first network is Network A, the first radio nodes are AN 1 and UE 1, and the first links include Link A from AN 1 to UE 1. In this case, correspondingly, the first control node 2200 is CCU A for controlling Network A. The following description on the first control node 2200 is made by way of this example, and it should be appreciated that this is only for illustration and the present disclosure is not limited thereto.

As shown in FIG. 22, the first control node 2200 includes a transmitting unit 2210, a receiving unit 2220, an adjusting unit 2230, an applying unit 2240, and a DLIM determining unit 2250. The DLIM determining unit 2250 is optional.

The transmitting unit 2210 is configured to transmit desired sounding and sensing related parameters of the first control node to a second control node controlling one or more second links among two or more second radio nodes in a second network neighboring the first network and operating at the same frequency as the first network. Following the example as shown in FIG. 6, the second network is Network B, the second control node is CCU B for controlling Network B, the second radio nodes are AN 2 and UE 2, and the second links include Link B from AN 2 to UE 2. So, in this example, the transmitting unit 2210 may transmit the first ADSS pattern to CCU B.

The receiving unit 2220 is configured to receive, from CCU B, sounding and sensing related parameters to be applied to the one or more second links, which are adjusted based on the desired sounding and sensing related parameters of the first control node (e.g., the adjusted second ADSS pattern).

The adjusting unit 2230 is configured to adjust the desired sounding and sensing related parameters of the first control node, based on the sounding and sensing related parameters to be applied to the one or more second links. For example, the adjusting unit 2230 adjusts the first ADSS pattern based on the adjusted second ADSS pattern.

In an implementation, the desired sounding and sensing related parameters of the first control node comprise a first sounding and sensing resource parameter for specifying a first sounding and sensing window. For example, the first ADSS pattern comprises a first ADSS. The sounding and sensing related parameters to be applied to the one or more second links comprise a second sounding and sensing resource parameter for specifying a second sounding and sensing window. For example, the second ADSS pattern comprises a second ADSS.

In this implementation, the adjusting unit 2230 is further configured to define a window aligned with the second sounding and sensing window as a sensing window for the two or more first radio nodes sensing a sounding signal transmitted by the one or more second radio nodes. For example, as shown in FIG. 16 or FIG. 17, the adjusting unit 2230 defines the first monitoring window to form the adjusted first ADSS pattern.

Furthermore, the applying unit 2240 is configured to apply the adjusted desired sounding and sensing related parameters to the one or more first links. For example, the applying unit 2240 may apply the adjusted first ADSS pattern to Link A as shown in FIG. 6.

In another implementation, the receiving unit 2220 is further configured to receive one or more sensing results from each of the two or more first radio nodes serving a receiving node of a link in the first network. In this case, the DLIM determining unit 2250 is configured to determine a DLIM based on the received one or more sensing results, e.g., the DLIM as shown in FIG. 15.

Figure 23:
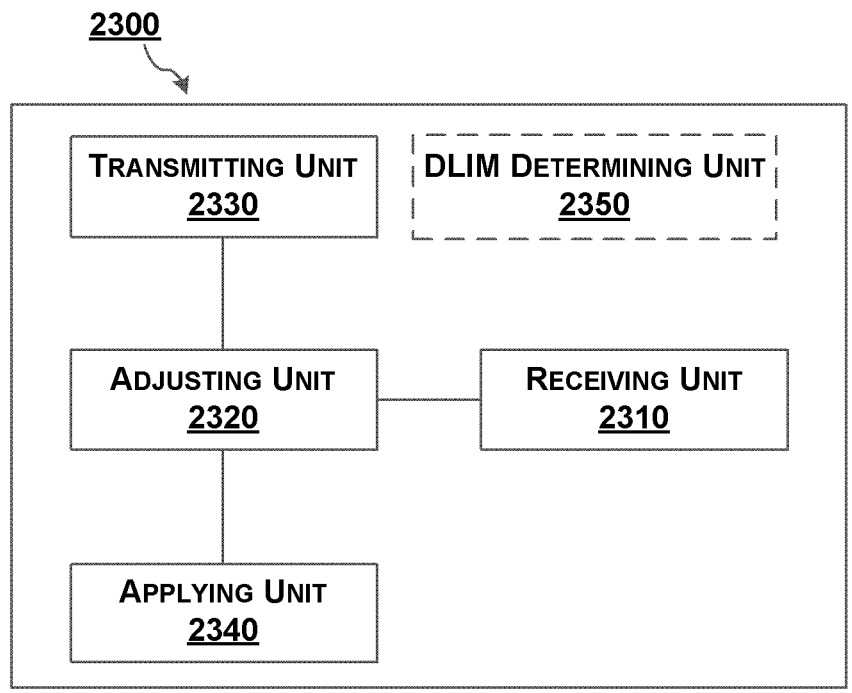
FIG. 23 is a schematic block diagram of a second control node 2300 according to the present disclosure.

FIG. 23 is a schematic block diagram of a second control node 2300 according to the present disclosure. The second control node 2300 controls one or more second links among two or more second radio nodes in a second network. Taking FIG. 6 as an example, the second network is Network B, the second radio nodes are AN 2 and UE 2, and the second links include Link B from AN 2 to UE 2. In this case, the second control node is CCU B for controlling Network B. The following description on the second control node 2300 is made by way of this example, and it should be appreciated that this is only for illustration and the present disclosure is not limited thereto.

As shown in FIG. 23, the second control node 2300 includes a receiving unit 2310, an adjusting unit 2320, a transmitting unit 2330, an applying unit 2340, and a DLIM determining unit 2350. The DLIM determining unit 2250 is optional.

The receiving unit 2310 is configured to receive, from a first control node controlling one or more second links among two or more first radio nodes in a first network neighboring the second network and operating at the same frequency as the second network, desired sounding and sensing related parameters of the first control node (e.g., the first ADSS pattern). Following the example as shown in FIG. 6, the first network is Network A, the first control node is CCU A for controlling Network A, the first radio nodes are AN 1 and UE 1, and the first links include Link A from AN 1 to UE 1.

The adjusting unit 2320 is configured to adjust sounding and sensing related parameters to be applied to the one or more second links (e.g., the second ADSS pattern), based on the desired sounding and sensing related parameters of the first control node. For example, CCU B adjusts the second ADSS pattern based on the first ADSS pattern to obtain the adjusted second ADSS pattern.

In an implementation, the desired sounding and sensing related parameters of the first control node comprise a first sounding and sensing resource parameter for specifying a first sounding and sensing window. For example, the first ADSS pattern comprises the first DSSI. The sounding and sensing related parameters to be applied to the one or more second links comprise a second sounding and sensing resource parameter for specifying a second sounding and sensing window. For example, the second ADSS pattern comprises the second DSSI.

In this implementation, the adjusting unit 2230 is further configured to define a window aligned with the first sounding and sensing window as a sensing window for the two or more second radio nodes sensing a sounding signal transmitted by the one or more first radio nodes. For example, as shown in FIG. 16 or FIG. 17, the adjusting unit 2230 defines the second monitoring window to form the adjusted second ADSS pattern.

Alternatively, the adjusting unit 2320 is further configured to adjust the second sounding and sensing window so that the second sounding and sensing window is orthogonal and adjacent to the first sounding and sensing window. For example, as shown in FIG. 18, in addition to defining the second monitoring window, the adjusting unit 2320 further adjusts the second DSSI, e.g., by moving the second DSSI to the left in time axis, so that the adjusted second DSSI are orthogonal and adjacent to the first DSSI.

Alternatively, the adjusting unit 2320 is further configured to adjust the first and second sounding and sensing windows so that there is an aligned window between the first and second sounding and sensing windows. The aligned window is allocated to one or more second links in the second network, which are not affected by the first network, as well as to one or more first links in the first network, which are not affected by the second network. For example, as shown in FIG. 19, in addition to defining the second monitoring window, the adjusting unit 2320 further adjusts the second DSSI, e.g., by moving the second DSSI to the left in time axis, so that the left half of the adjusted second DSSI is aligned with the right half of the first DSSI. This aligned window may be shared by Network A and Network B, and are allocated to links in Network A without inter-network inter-link interference from Network B, as well as to links in Network B without inter-network inter-link interference from Network A.

A size of the aligned window may be negotiated between CCU A and CCU B. For example, such a size may be either dynamic or fixed. Moreover, the size of the shared window may depend on the total number of links in one network without inter-network inter-link interference from the other network.

The transmitting unit 2330 is configured to transmit the adjusted sounding and sensing related parameters to the first control node. For example, the adjusted second ADSS pattern to CCU A.

The applying unit 2340 is configured to apply the adjusted sounding and sensing related parameters to the one or more second links. For example, applying unit 2340 may apply the adjusted second ADSS pattern to Link B as shown in FIG. 6.

In another implementation, the receiving unit 2310 is further configured to receive one or more sensing results from each of the two or more second radio nodes serving a receiving node of a link in the second network. In this implementation, the a DLIM determining unit 2350 is configured to determine a DLIM based on the received one or more sensing results, e.g., the DLIM as shown in FIG. 15.

FIG. 24 schematically shows an embodiment of an arrangement 2400 which may be used in the first control node 2200 or the second control node 2300 according to the present disclosure.

Comprised in the arrangement 2400 are here a processing unit 2406, e.g., with a Digital Signal Processor (DSP). The processing unit 2406 may be a single unit or a plurality of units to perform different actions of procedures described herein. The arrangement 2400 may also comprise an input unit 2402 for receiving signals from other entities, and an output unit 2404 for providing signal(s) to other entities. The input unit and the output unit may be arranged as an integrated entity or as illustrated in the example of FIG. 22 or FIG. 23.

Furthermore, the arrangement 2400 may comprise at least one computer program product 2408 in the form of a non-volatile or volatile memory, e.g., an Electrically Erasable Programmable Read-Only Memory (EEPROM), a flash memory and a hard drive. The computer program product 2408 comprises a computer program 2410, which comprises code/computer readable instructions, which when executed by the processing unit 2406 in the arrangement 2400 causes the arrangement 2400 and/or the first or second control node in which it is comprised to perform the actions, e.g., of the procedure described earlier in conjunction with FIG. 14, FIG. 20 or FIG. 21.

The computer program 2410 may be configured as a computer program code structured in computer program modules 2410A-2410E, or 2410F 2410J.

Hence, in an exemplifying embodiment when the arrangement 2400 is used in the first control node 2200, the code in the computer program of the arrangement 2400 includes a transmitting module 2410A, for transmitting desired sounding and sensing related parameters of the first control node to a second control node controlling one or more second links among two or more second radio nodes in a second network neighboring the first network and operating at the same frequency as the first network. The code in the computer program 2410 further includes a receiving module 2410B, for receiving, from the second control node, sounding and sensing related parameters to be applied to the one or more second links, which are adjusted based on the desired sounding and sensing related parameters of the first control node. The code in the computer program 2410 further includes an adjusting module 2410C, for adjusting the desired sounding and sensing related parameters of the first control node, based on the sounding and sensing related parameters to be applied to the one or more second links. The code in the computer program 2410 further includes an applying module 2410D, for applying the adjusted desired sounding and sensing related parameters to the one or more first links. The code in the computer program 2410 may comprise further modules, illustrated as module 2410E, e.g. for controlling and performing other related procedures associated with the first control node's operations.

In another exemplifying embodiment when the arrangement 2400 is used in the second control node 2300, the code in the computer program of the arrangement 2400 includes a receiving module 2410F, for receiving, from a first control node controlling one or more second links among two or more first radio nodes in a first network neighboring the second network and operating at the same frequency as the second network, desired sounding and sensing related parameters of the first control node. The code in the computer program further includes an adjusting module 2410G, for adjusting sounding and sensing related parameters to be applied to the one or more second links, based on the desired sounding and sensing related parameters of the first control node. The code in the computer program further includes a transmitting module 2410H, for transmitting the adjusted sounding and sensing related parameters to the first control node. The code in the computer program further includes an applying module 2410I, for applying the adjusted sounding and sensing related parameters to the one or more second links. The code in the computer program 2410 may comprise further modules, illustrated as module 2410J, e.g. for controlling and performing other related procedures associated with the second control node's operations.

The computer program modules could essentially perform the actions of the flow illustrated in FIG. 14 or FIG. 20, to emulate the first control node 2200, or the actions of the flow illustrated in FIG. 14 or FIG. 21, to emulate the second control node 2300. In other words, when the different computer program modules are executed in the processing unit 2406, they may correspond, e.g., to the units 2210-2240 of FIG. 22, or to the units 2310-2340 of FIG. 23.

Although the code means in the embodiments disclosed above in conjunction with FIG. 24 are implemented as computer program modules which when executed in the processing unit causes the arrangement to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the control node.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

The invention claimed is:

1. A method used in a first control node controlling one or more first links among two or more first radio nodes in a first network, wherein the one or more first links are directional links and the two or more first radio nodes utilize beam-forming for directional communication, the method comprising:

transmitting a first set of sounding and sensing related parameters of the first control node pertaining to the one or more first links to a second control node controlling one or more second links among two or more second radio nodes in a second network neighboring the first network and operating at the same frequency as the first network, wherein the one or more second links are directional links and the two or more second radio nodes utilize beam-forming for directional communication;

receiving, from the second control node, a second set of sounding and sensing related parameters pertaining to the one or more second links, but in which the second set of sounding and sensing related parameters are adjusted based on the first set of sounding and sensing related parameters transmitted from the first control node;

adjusting the first set of sounding and sensing related parameters of the first control node, based on the second set of sounding and sensing related parameters; and applying the adjusted first set of sounding and sensing related parameters to the one or more first links to determine interference within the first network from the two or more first radio nodes and interference from the two or more second radio nodes of the second network.

2. The method according to claim 1, wherein the first set of sounding and sensing related parameters of the first control node comprises a first sounding and sensing resource parameter for specifying a first sounding and sensing window, wherein the second set of sounding and sensing related parameters comprises a second sounding and sensing resource parameter for specifying a second sounding and sensing window, and wherein the adjusting the first set of sounding and sensing related parameters comprises defining a window aligned with the second sounding and sensing window as a sensing window for the two or more first radio nodes sensing a sounding signal transmitted by the one or more second radio nodes.

3. The method according to claim 1, further comprising:

receiving one or more sensing results from each of the two or more first radio nodes serving a receiving node of a link in the first network; and determining a Directional Link Interference Map (DLIM) based on the received one or more sensing results.

4. A method used in a second control node controlling one or more second links among two or more second radio nodes in a second network, wherein the one or more second links are directional links and the two or more second radio nodes utilize beam-forming for directional communication, the method comprising:

receiving, from a first control node controlling one or more first links among two or more first radio nodes in a first network neighboring the second network and operating at the same frequency as the second network, a first set of sounding and sensing related parameters of the first control node pertaining to the one or more first links, wherein the one or more first links are directional links and the two or more first radio modes utilize beam-forming for directional communication;

adjusting a second set of sounding and sensing related parameters of the second control node pertaining to the one or more second links, based on the first set of sounding and sensing related parameters of the first control node;

transmitting the adjusted second set of sounding and sensing related parameters to the first control node; and applying the adjusted second set of sounding and sensing related parameters to the one or more second links to determine interference within the second network from the two or more second radio nodes and interference from the two or more first radio nodes of the first network.

5. The method according to claim 4,
wherein the first set of sounding and sensing related parameters of the first control node comprises a first sounding and sensing resource parameter for specifying a first sounding and sensing window,
wherein the second set of sounding and sensing related parameters comprises a second sounding and sensing resource parameter for specifying a second sounding and sensing window, and
wherein the adjusting the second set of sounding and sensing related parameters comprises defining a window aligned with the first sounding and sensing window as a sensing window for the two or more second radio nodes sensing a sounding signal transmitted by the one or more first radio nodes.

6. The method according to claim 5, wherein the adjusting the second set of sounding and sensing related parameters further comprises adjusting the second sounding and sensing window so that the second sounding and sensing window is orthogonal and adjacent to the first sounding and sensing window.

7. The method according to claim 5, wherein the adjusting the second set of sounding and sensing related parameters further comprises adjusting the first and second sounding and sensing windows so that there is an aligned window between the first and second sounding and sensing windows, wherein the aligned window is allocated to one or more second links in the second network, which are not affected by the first network, and to one or more first links in the first network, which are not affected by the second network.

8. The method according to claim 7, wherein a size of the aligned window is negotiated between the first control node and the second control node.

9. The method according to claim 4, further comprising:
receiving one or more sensing results from each of the two or more second radio nodes serving a receiving node of a link in the second network; and
determining a Directional Link Interference Map (DLIM) based on the received one or more sensing results.

10. A first control node controlling one or more first links among two or more first radio nodes in a first network, wherein the one or more first links are directional links and the two or more first radio nodes utilize beam-forming for directional communication, the first control node comprising:
a processor; and
a memory containing instructions which, when executed by the processor, instruct the first control node to perform operations to:
transmit a first set of sounding and sensing related parameters of the first control node pertaining the one or more first links to a second control node controlling one or more second links among two or more second radio nodes in a second network neighboring the first network and operating at the same frequency as the first network, wherein the one or more second links are directional links and the two or more second radio nodes utilize beam-forming for directional communication;
receive, from the second control node, a second set of sounding and sensing related parameters pertaining to the one or more second links, but in which the second set of sounding and sensing related parameters are adjusted based on the first set of sounding and sensing related parameters transmitted from the first control node;
adjust the first set of sounding and sensing related parameters of the first control node, based on the second set of sounding and sensing related parameters; and
apply the adjusted first set of sounding and sensing related parameters to the one or more first links to determine interference within the first network from the two or more first radio nodes and interference from the two or more second radio nodes of the second network.

11. The first control node according to claim 10,
wherein the first set of sounding and sensing related parameters of the first control node comprises a first sounding and sensing resource parameter for specifying a first sounding and sensing window,
wherein the second set of sounding and sensing related parameters comprises a second sounding and sensing resource parameter for specifying a second sounding and sensing window, and
wherein the instructions which, when executed by the processor, further instruct the network node to perform operation to define a window aligned with the second sounding and sensing window as a sensing window for the two or more first radio nodes sensing a sounding signal transmitted by the one or more second radio nodes.

12. The first control node according to claim 10, further comprising:
wherein the instructions which, when executed by the processor, further instruct the network node to perform operations to receive one or more sensing results from each of the two or more first radio nodes serving a receiving node of a link in the first network, and
wherein the first control node further comprises a Directional Link Interference Map (DLIM) determining unit configured to determine a DLIM based on the received one or more sensing results.

13. A second control node controlling one or more second links among two or more second radio nodes in a second network, wherein the one or more second links are directional links and the two or more second radio nodes utilize beam-forming for directional communication, the second control node comprising:
a processor; and
a memory containing instructions which, when executed by the processor, instruct the second control node to perform operations to:
receive, from a first control node controlling one or more first links among two or more first radio nodes in a first network neighboring the second network and operating at the same frequency as the second network, a first set of sounding and sensing related parameters of the first control node pertaining to the one or more first links, wherein the one or more first links are directional links and the two or more first radio nodes utilize beam-forming for directional communication;
adjust a second set of sounding and sensing related parameters of the second control node pertaining to the one or more second links, based on the first set of sounding and sensing related parameters of the first control node;
transmit the adjusted second set of sounding and sensing related parameters to the first control node; and
apply the adjusted second set of sounding and sensing related parameters to the one or more second links to determine interference within the second network from the two or more second radio nodes and interference from the two or more first radio nodes of the first network.

14. The second control node according to claim 13,
wherein the first set of sounding and sensing related parameters of the first control node comprises a first sounding and sensing resource parameter for specifying a first sounding and sensing window,
wherein the second set of sounding and sensing related parameters comprises a second sounding and sensing resource parameter for specifying a second sounding and sensing window, and
wherein the instructions which, when executed by the processor, further instruct the network node to perform operations to define a window aligned with the first sounding and sensing window as a sensing window for the two or more second radio nodes sensing a sounding signal transmitted by the one or more first radio nodes.

15. The second control node according to claim 14, wherein the instructions which, when executed by the processor, further instruct the network node to perform operations to adjust the second sounding and sensing window so that the second sounding and sensing window is orthogonal and adjacent to the first sounding and sensing window.

16. The second control node according to claim 14,
wherein the instructions which, when executed by the processor, further instruct the network node to perform operations to adjust the first and second sounding and sensing windows so that there is an aligned window between the first and second sounding and sensing windows, and
wherein the aligned window is allocated to one or more second links in the second network, which are not affected by the first network, and to one or more first links in the first network, which are not affected by the second network.

17. The second control node according to claim 16, wherein a size of the aligned window is negotiated between the first control node and the second control node.

18. The second control node according to claim 13, further comprising:
wherein the instructions which, when executed by the processor, further instruct the network node to perform operations to receive one or more sensing results from each of the two or more second radio nodes serving a receiving node of a link in the second network, and
wherein the second control node further comprises a Directional Link Interference Map (DLIM) determining unit configured to determine a DLIM based on the received one or more sensing results.

19. A non-transitory computer readable storage medium containing instructions which, when executed by a processor in a first control node controlling one or more first links among two or more first radio nodes in a first network, and wherein the one or more first links are directional links and the two or more first radio nodes utilize beam-forming for directional communication, instruct the first control node to perform operations comprising:
transmitting a first set of sounding and sensing related parameters of the first control node pertaining to the one or more first links to a second control node controlling one or more second links among two or more second radio nodes in a second network neighboring the first network and operating at the same frequency as the first network, wherein the one or more second links are directional links and the two or more second radio nodes utilize beam-forming for directional communication;
receiving, from the second control node, a second set of sounding and sensing related parameters pertaining to the one or more second links, but in which the second set of sounding and sensing related parameters are adjusted based on the first set of sounding and sensing related parameters transmitted from the first control node;
adjusting the first set of sounding and sensing related parameters of the first control node, based on the second set of sounding and sensing related parameters; and
applying the adjusted first set of sounding and sensing related parameters to the one or more first links to determine interference within the first network from the two or more first radio nodes and interference from the two or more second radio nodes of the second network.

20. The non-transitory computer readable storage medium according to claim 19, wherein the instructions instruct the first control node to perform operations:
such that the first set of sounding and sensing related parameters of the first control node comprises a first sounding and sensing resource parameter for specifying a first sounding and sensing window,
wherein the second set of sounding and sensing related parameters comprises a second sounding and sensing resource parameter for specifying a second sounding and sensing window, and
adjusting the first set of sounding and sensing related parameters comprises defining a window aligned with the second sounding and sensing window as a sensing window for the two or more first radio nodes sensing a sounding signal transmitted by the one or more second radio nodes.

21. The non-transitory computer readable storage medium according to claim 19, wherein the instructions instruct the first control node to further perform operations comprising:
receiving one or more sensing results from each of the two or more first radio nodes serving a receiving node of a link in the first network; and
determining a Directional Link Interference Map (DLIM) based on the received one or more sensing results.

22. A non-transitory computer readable storage medium containing instructions which, when executed by a processor in a second control node controlling one or more second links among two or more second radio nodes in a second network, and wherein the one or more second links are directional links and the two or more second radio nodes utilize beam-forming for directional communication, instruct the second control node to perform operations comprising:
receiving, from a first control node controlling one or more first links among two or more first radio nodes in a first network neighboring the second network and operating at the same frequency as the second network, a first set of sounding and sensing related parameters of the first control node pertaining to the one or more first links, wherein the one or more first links are directional links and the two or more first radio nodes utilize beam-forming for directional communication;
adjusting a second set of sounding and sensing related parameters of the second control node pertaining to the one or more second links, based on the first set of sounding and sensing related parameters of the first control node;

transmitting the adjusted second set of sounding and sensing related parameters to the first control node; and applying the adjusted second set of sounding and sensing related parameters to the one or more second links to determine interference within the second network from the two or more second radio nodes and interference from the two or more first radio nodes of the first network.

23. The non-transitory computer readable storage medium according to claim 22, wherein the instructions instruct the second control node to further perform operations:

wherein the first set of sounding and sensing related parameters of the first control node comprises a first sounding and sensing resource parameter for specifying a first sounding and sensing window, wherein the second set of sounding and sensing related parameters comprises a second sounding and sensing resource parameter for specifying a second sounding and sensing window, and wherein the adjusting the second set of sounding and sensing related parameters comprises defining a window aligned with the first sounding and sensing window as a sensing window for the two or more second radio nodes sensing a sounding signal transmitted by the one or more first radio nodes.

24. The non-transitory computer readable storage medium according to claim 23, wherein the instructions instruct the second control node to further perform operations such that the adjusting the second set of sounding and sensing related parameters further comprises adjusting the second sounding and sensing window so that the second sounding and sensing window is orthogonal and adjacent to the first sounding and sensing window.

25. The non-transitory computer readable storage medium according to claim 23, wherein the instructions instruct the second control node to further perform operations such that adjusting the second set of sounding and sensing related parameters further comprises adjusting the first and second sounding and sensing windows so that there is an aligned window between the first and second sounding and sensing windows, wherein the aligned window is allocated to one or more second links in the second network, which are not affected by the first network, and to one or more first links in the first network, which are not affected by the second network.

26. The non-transitory computer readable storage medium according to claim 25, wherein the instructions instruct the second control node to further perform operations such that a size of the aligned window is negotiated between the first control node and the second control node.

27. The non-transitory computer readable storage medium according to claim 22, wherein the instructions instruct the second control node to further perform operations comprising:

receiving one or more sensing results from each of the two or more second radio nodes serving a receiving node of a link in the second network; and determining a Directional Link Interference Map (DLIM) based on the received one or more sensing results.

* * * * *